United States Patent
Madisetti et al.

(10) Patent No.: US 11,651,362 B2
(45) Date of Patent: May 16, 2023

(54) METHOD AND SYSTEM FOR ZERO-KNOWLEDGE AND IDENTITY BASED KEY MANAGEMENT FOR DECENTRALIZED APPLICATIONS

(71) Applicant: Vijay Madisetti, Johns Creek, GA (US)

(72) Inventors: Vijay Madisetti, Johns Creek, GA (US); Arshdeep Bahga, Chandigarh (IN)

(73) Assignee: Vijay Madisetti, Johns Creek, GA (US)

(*) Notice: Subject to any disclaimer, the term of this patent is extended or adjusted under 35 U.S.C. 154(b) by 0 days.

(21) Appl. No.: 17/654,600

(22) Filed: Mar. 14, 2022

(65) Prior Publication Data

US 2022/0200975 A1    Jun. 23, 2022

Related U.S. Application Data

(60) Division of application No. 17/457,983, filed on Dec. 7, 2021, which is a continuation-in-part of application
(Continued)

(51) Int. Cl.
     *G06Q 20/38*      (2012.01)
     *H04L 9/40*      (2022.01)
     (Continued)

(52) U.S. Cl.
     CPC ........ *G06Q 20/3829* (2013.01); *H04L 9/14* (2013.01); *H04L 63/061* (2013.01); *G06F 21/33* (2013.01);
     (Continued)

(58) Field of Classification Search
None
See application file for complete search history.

(56) References Cited

U.S. PATENT DOCUMENTS

| 9,954,828 B1 | 4/2018 | Chandrasekhar |
| 10,637,665 B1 | 4/2020 | Sundaresan |

(Continued)

FOREIGN PATENT DOCUMENTS

| CN | 106411506 B | 4/2019 |
| WO | 2006014358 A1 | 2/2006 |

(Continued)

OTHER PUBLICATIONS

F. Bruschi, T. Paulon, V. Rana and D. Sciuto, "A privacy preserving identification protocol for smart contracts," 2021 IEEE Symposium on Computers and Communications (ISCC), 2021, pp. 1-6, doi: 10.1109/ISCC53001.2021.9631501. (Year: 2021).*

(Continued)

*Primary Examiner* — Jacob C. Coppola
*Assistant Examiner* — Eduardo Castilho
(74) *Attorney, Agent, or Firm* — Widerman Malek, PL; Daniel C. Pierron

(57) ABSTRACT

A method for implementing zero-knowledge private key management for including receiving an identity smart contract creation transaction from a zero-knowledge wallet account, generating an identity smart contract responsive to the identity smart contract creation transaction at an identity smart contract address on the blockchain network, receiving a new validator transaction including a validator address, saving the validator address as an active validator to the identity smart contract, receiving a new user transaction from the use, receiving a transaction to validate the user from the validator, comparing the address from which the validate user transaction was received with the validator address, and upon determining the address from which the validate user transaction was received is identical to the validator address, saving the user as a user to the identity smart contract.

20 Claims, 25 Drawing Sheets

Related U.S. Application Data

No. 15/830,099, filed on Dec. 4, 2017, now Pat. No. 11,538,031.

(60) Provisional application No. 63/271,123, filed on Oct. 23, 2021, provisional application No. 63/257,603, filed on Oct. 20, 2021, provisional application No. 63/257,145, filed on Oct. 19, 2021, provisional application No. 62/479,966, filed on Mar. 31, 2017.

(51) Int. Cl.

| | | |
|---|---|---|
| *H04L 9/14* | (2006.01) | |
| *H04L 9/06* | (2006.01) | |
| *G06F 21/62* | (2013.01) | |
| *G06F 21/33* | (2013.01) | |
| *H04L 9/32* | (2006.01) | |
| *H04L 9/00* | (2022.01) | |

(52) U.S. Cl.
CPC ............ *G06F 21/6245* (2013.01); *G06F 2221/2115* (2013.01); *G06Q 2220/00* (2013.01); *H04L 9/0643* (2013.01); *H04L 9/3236* (2013.01); *H04L 9/3297* (2013.01); *H04L 9/50* (2022.05); *H04L 2463/061* (2013.01)

(56) References Cited

U.S. PATENT DOCUMENTS

| | | | |
|---|---|---|---|
| 10,885,501 | B2 | 1/2021 | Uhr et al. |
| 11,424,938 | B1* | 8/2022 | Meehan ............... H04L 9/3247 |
| 2003/0115464 | A1 | 6/2003 | Nyang et al. |
| 2003/0123672 | A1 | 7/2003 | Srinivasen |
| 2012/0167189 | A1 | 6/2012 | Aichroth |
| 2015/0262176 | A1 | 9/2015 | Langschaedel |
| 2017/0180128 | A1 | 6/2017 | Lu |
| 2017/0317833 | A1 | 11/2017 | Smith et al. |
| 2017/0317997 | A1 | 11/2017 | Smith |
| 2017/0344988 | A1* | 11/2017 | Cusden ............... G06Q 50/18 |
| 2018/0167807 | A1 | 6/2018 | Ying et al. |
| 2018/0225640 | A1 | 8/2018 | Chapman |
| 2018/0288022 | A1* | 10/2018 | Madisetti ........... G06Q 20/3829 |
| 2019/0104102 | A1* | 4/2019 | Khan .................. G06Q 20/382 |
| 2019/0303590 | A1* | 10/2019 | Hamel ............... G06Q 10/105 |
| 2019/0305952 | A1* | 10/2019 | Hamel ................ H04L 9/0866 |
| 2020/0026834 | A1* | 1/2020 | Vimadalal ........... G06F 16/9024 |
| 2020/0082126 | A1* | 3/2020 | Brown ................ G06Q 20/383 |
| 2020/0127828 | A1 | 4/2020 | Liu et al. |
| 2020/0127845 | A1* | 4/2020 | Yang .................. G06Q 20/3829 |
| 2020/0259637 | A1 | 8/2020 | Spohn et al. |
| 2020/0286084 | A1* | 9/2020 | Kwatra ................ G06N 20/00 |
| 2020/0344603 | A1 | 10/2020 | Gamishev |
| 2020/0372505 | A1 | 11/2020 | Turgman et al. |
| 2021/0217007 | A1* | 7/2021 | Menon ................ G06Q 20/02 |
| 2021/0224759 | A1 | 7/2021 | Zorzano et al. |
| 2021/0256508 | A1 | 8/2021 | Moy |
| 2021/0266170 | A1* | 8/2021 | Rossi ..................... G06F 21/32 |
| 2021/0327007 | A1 | 10/2021 | Han |
| 2022/0029810 | A1* | 1/2022 | Tang ..................... G06F 21/31 |

FOREIGN PATENT DOCUMENTS

| | | | | |
|---|---|---|---|---|
| WO | WO-2019159083 | A1 * | 8/2019 | ......... G06Q 30/0282 |
| WO | WO-2020141782 | A1 * | 7/2020 | ............ G06Q 20/16 |

OTHER PUBLICATIONS

E. Samir, H. Wu, M. Azab, C. Xin and Q. Zhang, "DT-SSIM: A Decentralized Trustworthy Self-Sovereign Identity Management Framework," in IEEE Internet of Things Journal, vol. 9, No. 11, pp. 7972-7988, 1 Jun. 1, 2022, doi: 10.1109/JIOT.2021.3112537. (Year: 2021).*

Š. Čučko and M. Turkanović, "Decentralized and Self-Sovereign Identity: Systematic Mapping Study," in IEEE Access, vol. 9, pp. 139009-139027, 2021, doi: 10.1109/ACCESS.2021.3117588. (Year: 2021).*

R. T. Moreno, J. García-Rodríguez, J. B. Bernabé and A. Skarmeta, "A Trusted Approach for Decentralised and Privacy-Preserving Identity Management," in IEEE Access, vol. 9, pp. 105788-105804, 2021, doi: 10.1109/ACCESS.2021.3099837. (Year: 2021).*

L. Zhang, H. Li, L. Sun, Z. Shi and Y. He, "Poster: Towards Fully Distributed User Authentication with Blockchain," 2017 IEEE Symposium on Privacy-Aware Computing (PAC), 2017, pp. 202-203, doi: 10,1109/PAC.2017.28. (Year: 2017).

U.S. Appl. No. 15/830,099, Non-Final Office Action, dated Mar. 10, 2022.

D. Jana, A. Chaudhuri, A. Datta and B. B. Bhaumik, "Dynamic User Credential Management in Grid Environment," TENCON 2005—2005 IEEE Region 10 Conference, 2005, pp. 1-6, doi: 10.1109/TENCON.2005-301310. (Year: 2005).

M. K. Ibraheem, "Modification of Diffie-Hellman key exchange algorithm for Zero Knowledge proof," 2012 International Conference on Future Communication Networks, 2012, pp. 147-152, doi: 10.1109/ICFCN.2012.6206859. (Year: 2021).

Istvan Lam—Zero knowledgfe encryption / Tresorit.com—retrieved on Jun. 24, 2016 from https://web.archive.org/web/20160624201200/https://tresorit.com/blog/zero-knowledge-encryption/ (Year: 2016).

Germundsson, Roger and Weisstein, Eric W. "XOR." From MathWorld—A Wolfram Web Resource. https://mathworld.wolfram.com/XOR.html, retrieved on May 16, 2020 from https://web.archive.org/web/20200516052102/https://mathworld.wolfram.com/XOR.html (Year: 2020).

U.S. Appl. No. 17/457,983, Non-Final Office Action, dated Mar. 24, 2022.

Final Office Action received in related pending U.S. Appl. No. 17/457,983.

Notice of Allowance received in related pending U.S. Appl. No. 15/830,099.

* cited by examiner

```
contract Seal {
        address public owner;
        uint public hashedData;

function Seal(uint _hashedData) {
                owner = msg.sender;
                hashedData = _hashedData;
        }
}
```
350

```
contract Certification {
        address public owner;
        address public sealedUserRecordAddress;
        address public sealedVerificationRecordAddress;
        uint public token;
        uint public tokenExpires;

function Certification(address _sealedUserRecordAddress,
                        address _sealedVerificationRecordAddress
                                uint _token, uint _tokenExpires) {
                owner = msg.sender;
                sealedUserRecordAddress = _sealedUserRecordAddress;
                sealedVerificationRecordAddress = _sealedVerificationRecordAddress;
                token = _token;
                tokenExpires = _tokenExpires;
        }
}
```
352

FIG. 4

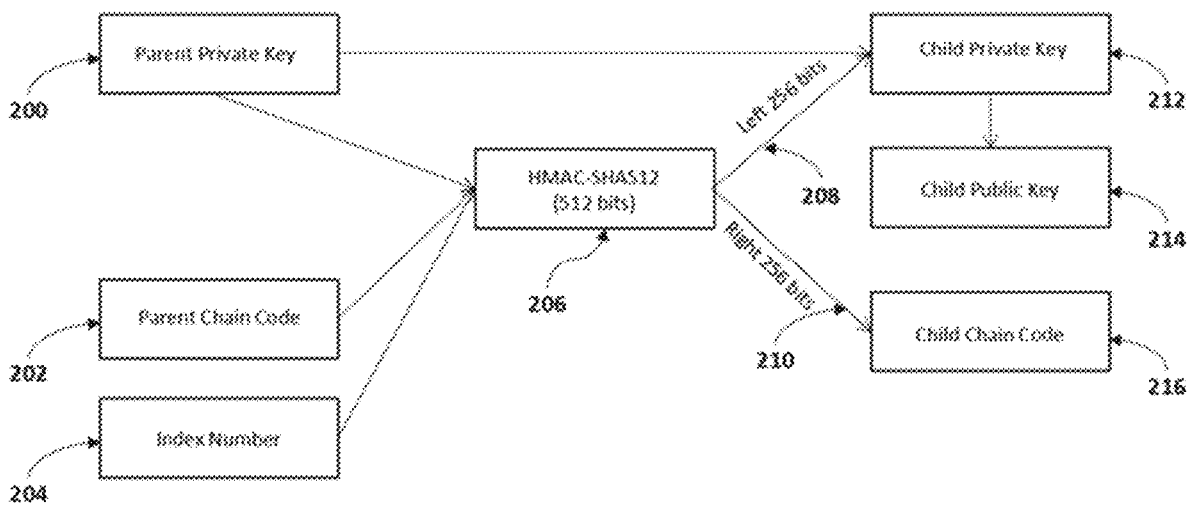

FIG. 5

METHOD AND SYSTEM FOR ZERO-KNOWLEDGE AND IDENTITY BASED KEY MANAGEMENT FOR DECENTRALIZED APPLICATIONS

RELATED APPLICATIONS

This application is a divisional application of and claims priority under 35 U.S.C. § 120 of U.S. patent application Ser. No. 17/457,983 filed on Dec. 7, 2021 and titled Method and System for Zero-Knowledge and Identity Based Key Management for Decentralized Applications, which in turn is a divisional application of and claims priority under 35 U.S.C. § 120 of U.S. patent application Ser. No. 15/830,099 filed on Dec. 4, 2017 and titled Method and System for Identity and Access Management for Blockchain Interoperability, which in turn claims priority under 35 U.S.C. § 119(e) of U.S. Provisional Patent Application Ser. No. 62/479,966 filed on Mar. 31, 2017 and titled Method and System for Identity and Access Management for Blockchain Interoperability, which in turn claims priority under 35 U.S.C. § 119(e) of U.S. Provisional Patent Application Ser. No. 63/257,145 filed on Oct. 19, 2021 and titled Zero Knowledge-Based Private Key Management for Decentralized Apps, which in turn claims priority under 35 U.S.C. § 119(e) of U.S. Provisional Patent Application Ser. No. 63/257,603 filed on Oct. 20, 2021 and titled zkKey—Key Management for Decentralized Applications, which in turn claims priority under 35 U.S.C. § 119(e) of U.S. Provisional Patent Application Ser. No. 63/271,123 filed on Oct. 23, 2021 and titled zkWallet—Key Management for Wallets. The contents of these applications are incorporated herein by reference.

FIELD OF THE INVENTION

The present invention relates to identity and access management for blockchain interoperability and zero-knowledge private key management for decentralized applications.

BACKGROUND

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

Existing Blockchain platforms lack identity management beyond the blockchain accounts and there is no way to know if two blockchain accounts belong to the same person. Blockchain applications can be prone to Sybil attacks where the attacker can create a large number of pseudonymous identities and then use them to gain a large influence on the network. In existing Blockchain platforms, there is no way to securely link a blockchain account to a real-user. Prior art linking blockchain accounts to real users is based on know your customer (KYC) processes that require the user to provide KYC documents such as a government issued identity card (such as passport or driving license). The KYC processes require manual verification by the platform or application team. When using multiple private and/or permissioned blockchain networks within a single organization, there is no way for a user to work on multiple blockchain networks while maintaining the same identity. For multiple blockchain networks within an organization or different applications deployed on the same blockchain network, existing solutions require the KYC process to be completed separately either for each blockchain network or for each application.

Blockchain wallets can be categorized into custodial and non-custodial wallets. A custodial wallet is a digital wallet whose private keys are held by the service provider/platform/crypto exchange. Users do not have full control over their private keys and the linked crypto assets. A non-custodial wallet is a digital wallet whose private keys are held by the user. A non-custodial gives users complete control of their keys and therefore the linked assets. The service provider/platform/crypto exchange doesn't store any data about the wallet. A non-custodial wallet, therefore, eliminates the third party between users and their crypto assets.

Custodial wallets, though easy to use, are risky as the private keys managed by the service provider/platform/ crypto exchange can be compromised. There is the principle of "not your keys, not your coins" commonly used in the crypto-world. Service provider/platform/crypto exchange can get hacked and the private keys and the linked assets can be stolen. The service provider/platform/crypto exchange can stop users from moving or spending the crypto assets in the wallet if they so choose to.

Non-custodial wallets, though more secure than custodial wallets, are tedious to use as they depend on a third-party extension like Metamask. Also, they do not work in mobile applications and/or decentralized applications ("Dapps").

Currently there are a number of ways to interact with a Dapp (not an admission that either approach is prior art):

1. Use a non-custodial wallet like Metamask where the user manages the private key and signs the transactions. In this approach, the service provider/platform does not store the private key in cloud. Should the user lose the private key, the non-custodial wallet is likely to be permanently locked and the assets contained thereby irretrievably lost.

2. Use a custodial wallet where the service provider/platform generates a private key on user's behalf and stores it in the cloud. This approach presents safety concerns, as a large number of users' private keys can be accessed by bad actors, their custodial wallets unlocked, and the assets contained thereby stolen.

Accordingly, there is a need in the art that prevents against the type of key loss associated with non-custodial wallets while also preventing the mass theft of private keys as is possible with custodial wallets.

This background information is provided to reveal information believed by the applicant to be of possible relevance to the present invention. No admission is necessarily intended, nor should be construed, that any of the preceding information constitutes prior art against the present invention.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method of generating wallets for discrete blockchain networks comprising receiving a primary seed, generating an enhanced hierarchical deterministic wallet, comprising deriving an enhanced parent public key and an enhanced parent private key from the primary seed, and performing an identity registration and certification procedure for the enhanced hierarchical deterministic wallet. The method may further comprise receiving a first secondary seed, generating a first toughened hierarchical deterministic wallet, comprising deriving a first toughened parent public key and a first toughened parent private key from the first secondary seed, deriving a first toughened primary child public key from a function including as inputs the first toughened parent public key, a first parent chain code, and the enhanced parent public key, and deriving a first toughened primary child private key from a function including as inputs the first toughened parent private key, the first parent chain code, and the enhanced parent private key. Additionally, the method may further comprise performing the identity registration and certification procedure for the first toughened hierarchical deterministic wallet. An identify of a user associated with each of the enhanced hierarchical deterministic wallet and the first toughened hierarchical deterministic wallet may be verifiable by an external blockchain network as a result of the identity registration and certification procedures.

In some embodiments, each of the first toughened primary child public key and the first toughened primary child private key are operable to be exported to a blockchain network. In some embodiments, generating the enhanced hierarchical deterministic wallet further comprises may comprise deriving an enhanced primary child public key from the enhanced parent public key and deriving an enhanced primary child private key from the enhanced parent private key. Furthermore, in some embodiments, at least one of the enhanced primary child public key, enhanced primary child private key, first toughened child public key, and first toughened child private key expires after a length of time. Additionally, in some embodiments, at least one of the enhanced primary child public key, enhanced primary child private key, first toughened child public key, and first toughened child private key may expire after a number of uses.

Furthermore, generating the first toughened hierarchical deterministic wallet nay further comprises deriving a first child chain code from the function including as inputs the first toughened parent public key, a first parent chain code, and the enhanced parent public key, deriving a first toughened secondary child public key from a function including as inputs the first toughened primary child public key, the first child chain code, and the enhanced primary child public key, and deriving a first toughened secondary child private key from a function including as inputs the first toughened primary child private key, the first child chain code, and the enhanced primary child private key.

Additionally, each of the first toughened primary child public key and the first toughened primary child private key of the first toughened hierarchical deterministic wallet may be operable to be exported to a first blockchain network and each of the first toughened secondary child public key and the first toughened secondary child private key of the first toughened hierarchical deterministic wallet are operable to be exported to a second blockchain network. Furthermore, generating the first toughened hierarchical deterministic wallet may further comprise deriving a second toughened secondary child public key from a function including as inputs the first toughened primary child public key, a first child chain code, and the enhanced primary child public key and deriving a second toughened secondary child private key from a function including as inputs the first toughened primary child private key, a second child chain code, and the enhanced primary child private key. Additionally, the second toughened secondary child public key may be non-equal to the first toughened secondary child public key and the second toughened secondary child private key is non-equal to the first toughened secondary child private key.

In some embodiments, generating the enhanced hierarchical deterministic wallet may further comprise deriving an enhanced secondary child public key from the enhanced primary child public key and deriving an enhanced secondary child private key from the enhanced primary child private key. Furthermore, generating the first toughened hierarchical deterministic wallet may further comprise deriving a second toughened primary child public key from a function including as inputs the first toughened parent public key, the first parent chain code, and the enhanced parent public key and deriving a second toughened primary child private key from a function including as inputs the first toughened parent private key, the first parent chain code, and the enhanced parent private key. Additionally, each of the first toughened primary child public key and the first toughened primary child private key of the first toughened hierarchical deterministic wallet may be operable to be exported to a first blockchain network and each of the second toughened primary child public key and the second toughened primary child private key of the first toughened hierarchical deterministic wallet are operable to be exported to a second blockchain network.

In some embodiments, the method of generating wallets may further comprise receiving a second secondary seed and generating a second toughened hierarchical deterministic wallet, comprising deriving a first toughened parent public key and a first toughened parent private key from the second secondary seed, deriving a first toughened primary child public key from a function including as inputs the first toughened parent public key of the second toughened hierarchical deterministic wallet, a first parent chain code of the first toughened parent public key of the second toughened hierarchical deterministic wallet, and the enhanced parent public key. Additionally, the method of generating wallets may further comprise deriving a first toughened primary child private key from a function including as inputs the first toughened parent private key of the second toughened hierarchical deterministic wallet, a second parent chain code of the first toughened parent private key of the second toughened hierarchical deterministic wallet, and the enhanced parent private key. Furthermore, the method may comprise performing the identity registration and certification procedure for the second toughened hierarchical deterministic wallet. The first toughened primary child public key of the first toughened hierarchical deterministic wallet may be non-equivalent to the first toughened primary child public key of the second toughened hierarchical deterministic wallet and the first toughened primary child private key of the first toughened hierarchical deterministic wallet may be non-equivalent to the first toughened primary child public key of the second toughened hierarchical deterministic wallet.

In some embodiments, each of the first toughened primary child public key and the first toughened primary child private key of the first toughened hierarchical deterministic wallet are operable to be exported to a first blockchain network and each of the first toughened primary child public key and the first toughened primary child private key of the second toughened hierarchical deterministic wallet are operable to be exported to a second blockchain network. Furthermore, in some embodiments, generating the enhanced hierarchical deterministic wallet may further comprise deriving a first enhanced primary child public key from the enhanced parent public key, deriving a first enhanced primary child private key from the enhanced parent private key, deriving a second enhanced primary child public key from the enhanced parent public key, and deriving a second enhanced primary child private key from the enhanced parent private key. The first enhanced primary child public key may be non-equal to the second enhanced primary child public key and the first enhanced primary child private key may be non-equal to the second enhanced primary child private key. Furthermore, generating the second toughened hierarchical deterministic wallet may further comprise deriving a first toughened secondary child public key from a function including as inputs the first toughened primary child public key of the second toughened hierarchical deterministic wallet, a first child chain code of the first toughened primary child public key of the second toughened hierarchical deterministic wallet, and the second enhanced primary child public key and deriving a first toughened secondary child private key from a function including as inputs the first toughened primary child private key of the second toughened hierarchical deterministic wallet, a second child chain code of the first toughened primary child private key of the second toughened hierarchical deterministic wallet, and the second enhanced primary child private key.

Additionally, the method of generating wallets may further comprise deriving the first toughened primary child public key, which may comprise deriving the first toughened primary child public key from a function including as inputs the first toughened parent public key, the first parent chain code, the enhanced parent public key, and an index number and deriving the first toughened primary child private key comprises deriving the first toughened primary child private key from a function including as inputs the first toughened parent private key, the first parent chain code, the enhanced parent private key, and an index number.

In some embodiments, the identity registration and certification procedure may comprise receiving hashed user identification information that has been signed with a private key of the user from the user, defining a seal contract, generating an address of the seal contract, defined as a sealed user record address, and providing the sealed user record address. The procedure may further comprise receiving a hashed verification record from a certificate authority, generating an address of a verification contract from the hashed verification record, defined as a sealed verification record address and providing the sealed verification record address. Furthermore, the procedure may further comprise generating a certification contract from a combination of the sealed user record address, a certification token, and the sealed verification record address, providing a certification contract address, receiving a verification record by a certification authority comprising the hashed user identification information and a token, and receiving a combination of the certification contract address and the seal contract, defining a received certification contract address and a received seal contract, respectively. Additionally, the procedure may further comprise obtaining each of the sealed user record address and the sealed verification record address from the certification contract address, retrieving the seal contract from the sealed user record address, defining a retrieved seal contract, decrypting the retrieved seal contract using a public key associated with the user, defining a decrypted retrieved seal contract, and comparing the decrypted retrieved seal contract and the received seal contract. Yet further, the procedure may comprise retrieving the verification contract from the sealed verification record address, defining a retrieved verification contract, obtaining a certification token from the certification contract address, generating a hashed confirming verification record by hashing the combination of the decrypted retrieved seal contract and the certification token, and comparing the hashed confirming verification record to the retrieved verification contract. Upon a comparison of the decrypted retrieved seal contract and the received seal contract indicating they are equal and the comparison of the hashed confirming verification record to the retrieved verification contract indicating they are equal, a session certification token for a decentralized application may be generated. Finally, the procedure may comprise transmitting the session certification token to the user.

Furthermore, embodiments of the invention are directed to a method of generating wallets for discrete blockchain networks comprising receiving a primary seed, and generating an enhanced hierarchical deterministic wallet comprising deriving an enhanced parent public key and an enhanced parent private key from the primary seed, and performing an identity registration and certification procedure for the enhanced hierarchical deterministic wallet. The method of generating wallets may further comprise receiving a first secondary seed and generating a first toughened hierarchical deterministic wallet, which may comprise deriving a first toughened parent public key and a first toughened parent private key from the first secondary seed, deriving a first toughened primary child public key from a function including as inputs the first toughened parent public key, a first parent chain code, and the enhanced parent public key, and deriving a first toughened primary child private key from a function including as inputs the first toughened parent private key, the first parent chain code, and the enhanced parent private key. The method of generating wallets may further comprise performing the identity registration and certification procedure for the first toughened hierarchical deterministic wallet, receiving a second secondary seed, and generating a second toughened hierarchical deterministic wallet, which may comprise deriving a first toughened parent public key and a first toughened parent private key from the second secondary seed, deriving a first toughened primary child public key from a function including as inputs the first toughened parent public key of the second toughened hierarchical deterministic wallet, a first parent chain code of the first toughened parent public key of the second toughened hierarchical deterministic wallet, and the enhanced parent public key, and deriving a first toughened primary child private key from a function including as inputs the first toughened parent private key of the second toughened hierarchical deterministic wallet, a second parent chain code of the first toughened parent private key of the second toughened hierarchical deterministic wallet, and the enhanced parent private key. Additionally, the method of generating wallets may further comprise performing the identity registration and certification procedure for the second toughened hierarchical deterministic wallet. The first toughened primary child public key of the first toughened hierarchical deterministic wallet may be non-equivalent to the first toughened primary child public key of the second toughened hierarchical deterministic wallet and the first toughened primary child private key of the first toughened hierarchical deterministic wallet may be non-equivalent to the first toughened primary child public key of the second toughened hierarchical deterministic wallet. Furthermore, an identify of a user associated with each of the enhanced hierarchical deterministic wallet, the first toughened hierarchical deterministic wallet, and the second toughened hierarchical deterministic wallet is verifiable by an external blockchain network as a result of the identity registration and certification procedures. Each of the toughened first primary child public key and the first toughened primary child private key of the first toughened hierarchical deterministic wallet may be operable to be exported to a first blockchain network. Additionally, each of the first toughened primary child public key and the first toughened primary child private key of the second toughened hierarchical deterministic wallet may be operable to be exported to a second blockchain network.

In some embodiments, generating the enhanced hierarchical deterministic wallet may further comprise deriving an enhanced primary child public key from the enhanced parent public key and deriving an enhanced primary child private key from the enhanced parent private key. Additionally, generating the first toughened hierarchical deterministic wallet may further comprise deriving a first child chain code from the function including as inputs the first toughened parent public key, a first parent chain code, and the enhanced parent public key, deriving a first toughened secondary child public key from a function including as inputs the first toughened primary child public key, the first child chain code, and the enhanced primary child public key, and deriving a first toughened secondary child private key from a function including as inputs the first toughened primary child private key, the first child chain code, and the enhanced primary child private key.

Furthermore, embodiments of the invention are directed to a system for generating wallets for discrete blockchain networks, comprising a processor, a data store positioned in communication with the processor, and a network communication device positioned in communication with each of the processor, the data store, and a network. The network communication device may be operable to receive a primary seed via the network and transmit the primary seed to the processor. Additionally, the processor may be operable to generate an enhanced hierarchical deterministic wallet, comprising deriving an enhanced parent public key and an enhanced parent private key from the primary seed and store the enhanced hierarchical deterministic wallet on the data store. Furthermore, the network communication device may be operable to transmit the enhanced hierarchical deterministic wallet across the network. Further, the processor and network communication device may be operable to perform an identity registration and certification procedure for the enhanced hierarchical deterministic wallet. The network communication device may be operable to receive a first secondary seed and transmit the first secondary seed to the processor. Additionally, the processor is operable to generate a first toughened hierarchical deterministic wallet by deriving a first toughened parent public key and a first toughened parent private key from the first secondary seed, deriving a first toughened primary child public key from a function including as inputs the first toughened parent public key, a first parent chain code, and the enhanced parent public key, and deriving a first toughened primary child private key from a function including as inputs the first toughened parent private key, the first parent chain code, and the enhanced parent private key. The processor and network communication device may be operable to perform the identity registration and certification procedure for the first toughened hierarchical deterministic wallet. Furthermore, an identify of a user associated with each of the enhanced hierarchical deterministic wallet and the first toughened hierarchical deterministic wallet is verifiable by an external blockchain network as a result of the identity registration and certification procedures.

In some embodiments, each of the first toughened primary child public key and the first toughened primary child private key may be operable to be exported to a blockchain network. Furthermore, the processor may be operable to derive an enhanced primary child public key from the enhanced parent public key, derive an enhanced primary child private key from the enhanced parent private key, derive a first child chain code from the function including as inputs the first toughened parent public key, a first parent chain code, and the enhanced parent public key, derive a first toughened secondary child public key from a function including as inputs the first toughened primary child public key, the first child chain code, and the enhanced primary child public key, and derive a first toughened secondary child private key from a function including as inputs the first toughened primary child private key, the first child chain code, and the enhanced primary child private key.

Additionally, in some embodiments, the network communication device may be operable to receive a second secondary seed and the processor may be operable to generate a second toughened hierarchical deterministic wallet by deriving a first toughened parent public key and a first toughened parent private key from the second secondary seed, deriving a first toughened primary child public key from a function including as inputs the first toughened parent public key of the second toughened hierarchical deterministic wallet, a first parent chain code of the first toughened parent public key of the second toughened hierarchical deterministic wallet, and the enhanced parent public key, and deriving a first toughened primary child private key from a function including as inputs the first toughened parent private key of the second toughened hierarchical deterministic wallet, a second parent chain code of the first toughened parent private key of the second toughened hierarchical deterministic wallet, and the enhanced parent private key. Furthermore, the processor may be operable to perform the identity registration and certification procedure for the second toughened hierarchical deterministic wallet. The first toughened primary child public key of the first toughened hierarchical deterministic wallet may be non-equivalent to the first toughened primary child public key of the second toughened hierarchical deterministic wallet and the first toughened primary child private key of the first toughened hierarchical deterministic wallet may be non-equivalent to the first toughened primary child public key of the second toughened hierarchical deterministic wallet.

In some embodiments, each of the first toughened primary child public key and the first toughened primary child private key of the first toughened hierarchical deterministic wallet may be operable to be exported to a first blockchain network and each of the first toughened primary child public key and the first toughened primary child private key of the second toughened hierarchical deterministic wallet are operable to be exported to a second blockchain network. Additionally, the network communication device may be operable to receive hashed user identification information that has been signed with a private key of the user from the user, defining a seal contract, and transmit the seal contract to the processor. Furthermore, the processor may be operable to generate an address of the seal contract, defined as a sealed user record address. The network communication device may be operable to provide the sealed user record address and to receive a hashed verification record from a certificate authority and transmit the hashed verification record to the processor. The processor may be operable to generate an address of a verification contract from the hashed verification record, defined as a sealed verification record address. Additionally, the network communication device may be operable to provide the sealed verification record address. Furthermore, the processor may be operable to generate a certification contract from a combination of the sealed user record address, a certification token, and the sealed verification record address. The network communication device may be operable to provide a certification contract address and receive a combination of the certification contract address and the seal contract, defining a received certification contract address and a received seal contract, respectively, and transmit the received certification contract address and the received seal contract to the processor. The processor may operable to obtain each of the sealed user record address and the sealed verification record address from the certification contract address, the network communication device may be operable to retrieve the seal contract from the sealed user record address, defining a retrieved seal contract, and the processor may be operable to decrypt the retrieved seal contract using a public key associated with the user, defining a decrypted retrieved seal contract. Furthermore, the processor may be operable to compare the decrypted retrieved seal contract and the received seal contract and the network communication device may be operable to retrieve the verification contract from the sealed verification record address, defining a retrieved verification contract, and transmit the retrieved verification contract to the processor and obtain a certification token from the certification contract address and transmit the certification token to the processor. Additionally, the processor may be operable to generate a hashed confirming verification record by hashing the combination of the decrypted retrieved seal contract and the certification token to compare the hashed confirming verification record to the retrieved verification contract and to, upon a comparison of the decrypted retrieved seal contract and the received seal contract indicating they are equal and the comparison of the hashed confirming verification record to the retrieved verification contract indicating they are equal, generate a session certification token for a decentralized application. The network communication device may be operable to transmit the session certification token to the user.

Furthermore, embodiments of the invention are directed to a method of generating zero-knowledge (ZK) wallet or zkWallet that provides a new way of interacting with Decentralized Apps or Dapps. A zkWallet provides the security of a non-custodial wallet and the convenience of a custodial wallet. In this new approach, the keys are generated on client side and Zero Knowledge (ZK) encryption is used on client side to encrypt the keys such that the Dapp or Platform only stores the encrypted private key and only the user knows how to decrypt it. This new ZK approach doesn't need any third-party extension like Metamask and works in both web and mobile apps. The service provider/platform/crypto exchange doesn't have knowledge of the user's private key. This new approach eliminates any third party between the user and the user's crypto assets. The user owns the private key and the linked crypto assets. Zero Knowledge Encryption is used at the client-side, so only the user can access the private key and sign transactions with the private key. The service provider/platform/crypto exchange cannot sign a transaction on user's behalf. When a user has to send a transaction, the encrypted private key stored in the zkWallet Server is sent to user's device where it is decrypted. The user then signs the transaction with the decrypted private key on the device itself and relays the signed transaction to the zkWallet Server.

In some embodiments, instead of storing the encrypted private on the zkWallet Server, the encrypted key can be stored on the zkWallet client itself.

In some embodiments, in addition to storing a single key, a group of related keys can be generated and added to a wallet of keys to be managed on the zkWallet Server for the user. Furthermore, the keys can be rotated can regular or user-defined intervals.

In some embodiments, oAuth can be used to negotiate a connection and authenticate with the zkWallet Server. Furthermore, challenge/response authentication or encrypted authentication tokens can be used for authentication with the server.

Furthermore, embodiments of the invention are directed to a method of linking user identity to a zero-knowledge (ZK) wallet or zkWallet.

Furthermore, embodiments of the invention are directed to a method of bidirectional authentication to secure a connection between a client (such as zkWallet client or prover) and server (such as zkWallet server or verifier).

BRIEF DESCRIPTION OF THE DRAWINGS

FIG. 4 is a reference implementation of Seal and Certification smart contracts, according to an embodiment of the invention;

FIG. 5 is an illustration of hardened derivation of a child key in a Hierarchical Deterministic wallet as proposed in BIP0032;

DETAILED DESCRIPTION OF THE INVENTION

Figure 1:
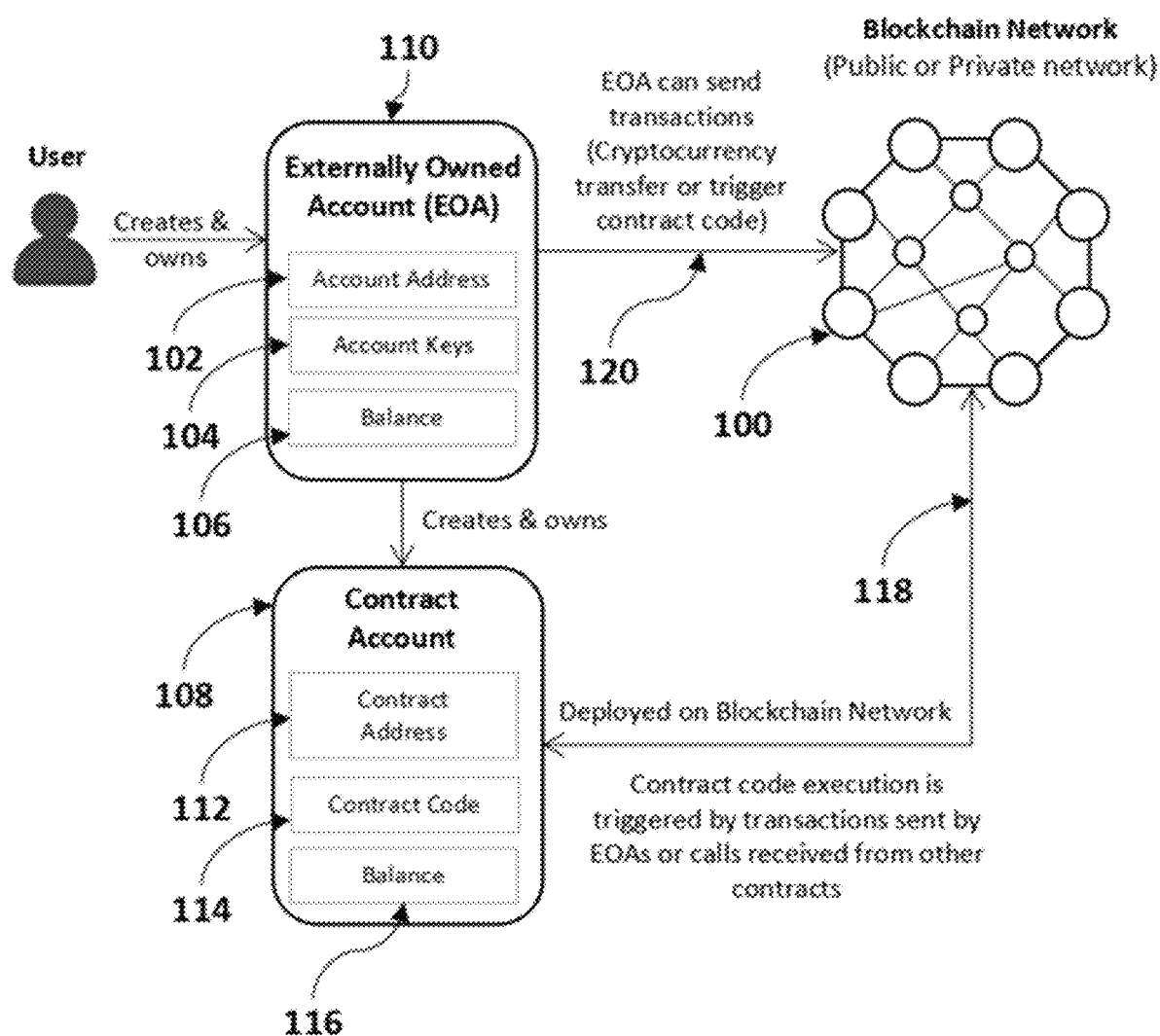
FIG. 1 is an illustration of the blockchain account types and interactions.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-12, an Identity and Access Management system for Blockchain Interoperability according to an embodiment of the present invention is now described in detail. Throughout this disclosure, the present invention may be referred to as a Blockchain Identity and Access Management (B-IAM) system, a blockchain identity system, blockchain access management system, a blockchain access control system, a device, a system, a product, and a method. Those skilled in the art will appreciate that this terminology is only illustrative and does not affect the scope of the invention. Moreover, those skilled in the art will appreciate that all processes described herein may be performed by a computing device comprising, but not limited to, a network communication device operable to communicate across a network, such as a wide area network, including the Internet, a processor in communication with the networking communication device and operable to perform computing functions, and a data store capable of receiving, storing, and providing information to each of the network communication device and the processor.

Referring now to FIG. 1, for example, and without limitation, blockchain account types and interactions between them, are described in more detail. Blockchain is a distributed and public ledger which maintains records of all the transactions. A blockchain network 100 is a truly peer-to-peer network and it does not require a trusted central authority or intermediaries to authenticate or to settle the transactions or to control the network infrastructure. Users can interact and transact with the blockchain networks through Externally Owned Account (EOAs) 110, which are owned and controlled by the users. Each EOA 110 has an account address 102, account public-private keys 104 and a balance 106 (in certain units of a Cryptocurrency associated with the Blockchain network) associated with it. EOAs do not have any associated code. All transactions 120 on a blockchain network are initiated by EOAs. These accounts can send transactions to other EOAs or contract accounts. Another type of accounts support by second generation programmable Blockchain platforms are the Contract Accounts 108. A Contract Account 108 is created and owned by an EOA 110, is located at a contract address 112, and is controlled by the associated contract code 114 which is stored with the contract account 108. Additionally, the contract account 108 may comprise a balance 116, which may be identical to the balance 106 of the EOA 110. The contract code 112 execution is triggered by transactions 118 sent by EOAs or messages sent by other contracts.

Figure 2:
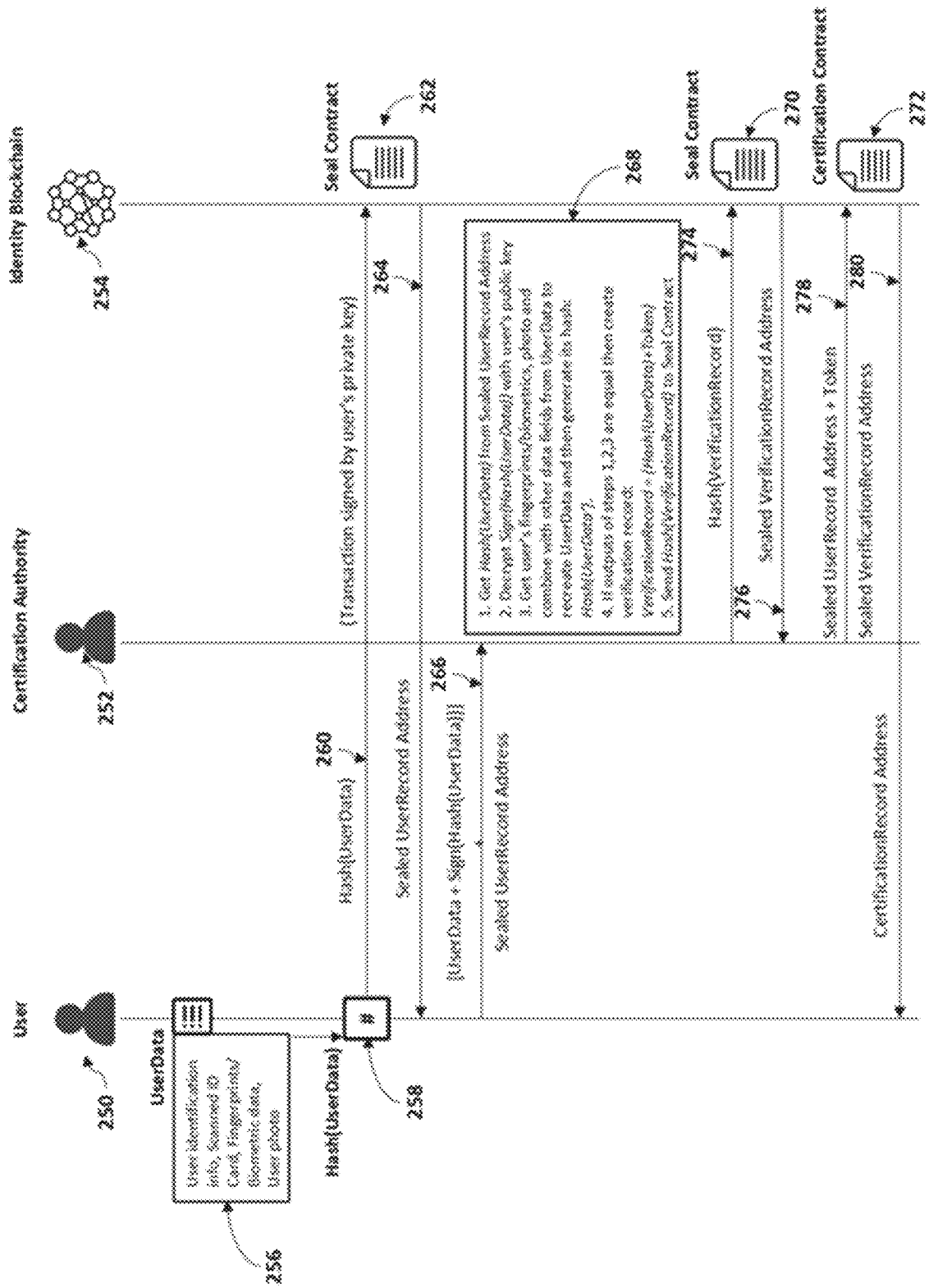
FIG. 2 is an illustration of the user registration and certification process, according to an embodiment of the invention.

An embodiment of the invention provides a system and associated methods for securely linking blockchain accounts to real users. Referring to FIG. 2, the user registration and certification process, for securely linking blockchain accounts to real users, is described in more detail. User registration process is done to link a real user 250 to one or more blockchain accounts. For the registration process, the user 250 either uses a registration application either on mobile or a desktop computer. In the registration application, the user provides the identification information (including fields such as name, address, date of birth and other identification information), scanned identification card (such as a driver license, passport or other types of ID cards), fingerprints and other biometric data, user photo, and any other type of data that can be used to identify the user. Each data field provided by the user in the registration application (collectively referred to as the 'UserData' 256) is hashed using a one-way hash function 258, generating hashed data 260. The registration application then creates a new smart contract from this hashed data 260, which is referred to as the 'Seal Contract' 262. The transaction to create this new Seal Contract 262 on the blockchain network is signed by the user's private key. The Seal Contract 262 maintains a record of the hashed user data and the user's address on the blockchain network. A separate private and/or permissioned blockchain 254 may be used for user identity management, where the Seal Contract is deployed. When the transaction to create the new Seal Contract is mined, the user gets an address of the contract, which is referred to as the 'Sealed UserRecord Address' 264. This completes the user registration process.

The next step is the certification process, in which the user provides the 'UserData', digitally signed and hashed 'UserData', and the 'Sealed UserRecord Address' 266 to a certification authority 252. The data is signed by the user's private key. This data may be shared with the certification authority 252 over an encrypted and secure channel, so that only the certification authority can decrypt and access the data. The certification authority 252 then verifies if the UserRecord has been created and sealed by the user 250 and if the user own's the record and the associated Seal Contract 262 by performing a certification process 268. The steps involved in the certification process 268 may include, as follows:

1. Get Hash(UserData) from Sealed UserRecord Address
2. Decrypt Sign(Hash(UserData)) with user's public key
3. Get user's fingerprints and/or biometric data, user photo and combine with other data fields from UserData to recreate UserData and then generate its hash: Hash(UserData').
4. If outputs of steps 1, 2, 3 above are equal then create verification record as follows:

$$VerificationRecord=(Hash(UserData)+Token)$$

5. Create a new Seal Contract with Hash(VerificationRecord) 274 as the input data.

The transaction to create this new Seal Contract 270 on the blockchain is signed by the certification authority's private key. When the transaction to create the new Seal Contract 270 is mined, the certification authority 252 gets an address of the contract, which is referred to as the 'Sealed VerificationRecord Address' 276.

Next the certification authority creates a new smart contract, referred to as the 'Certification Contract' 272 by providing the Sealed UserRecord Address 264, Certification Token and Sealed VerificationRecord Address 276 as the input data 278 to the contract. When the transaction to create the Certification Contract 272 is mined, the certification authority gets an address of the contract, which is referred to as the 'Certification Record Address' 280, and shares this address with the user. This completes the user certification process. The certification process establishes the ownership of the blockchain account (and its associated public-private key-pairs) to a real user 250 whose identity is verified by the certification authority 252. The certification token can be used to set a validity or a timeout period for a key-pair. After the timeout of the certification of key-pair, the certification process has to be done again. This certification renewal process adds additional security and prevents against any misuse of keys.

Figure 3:
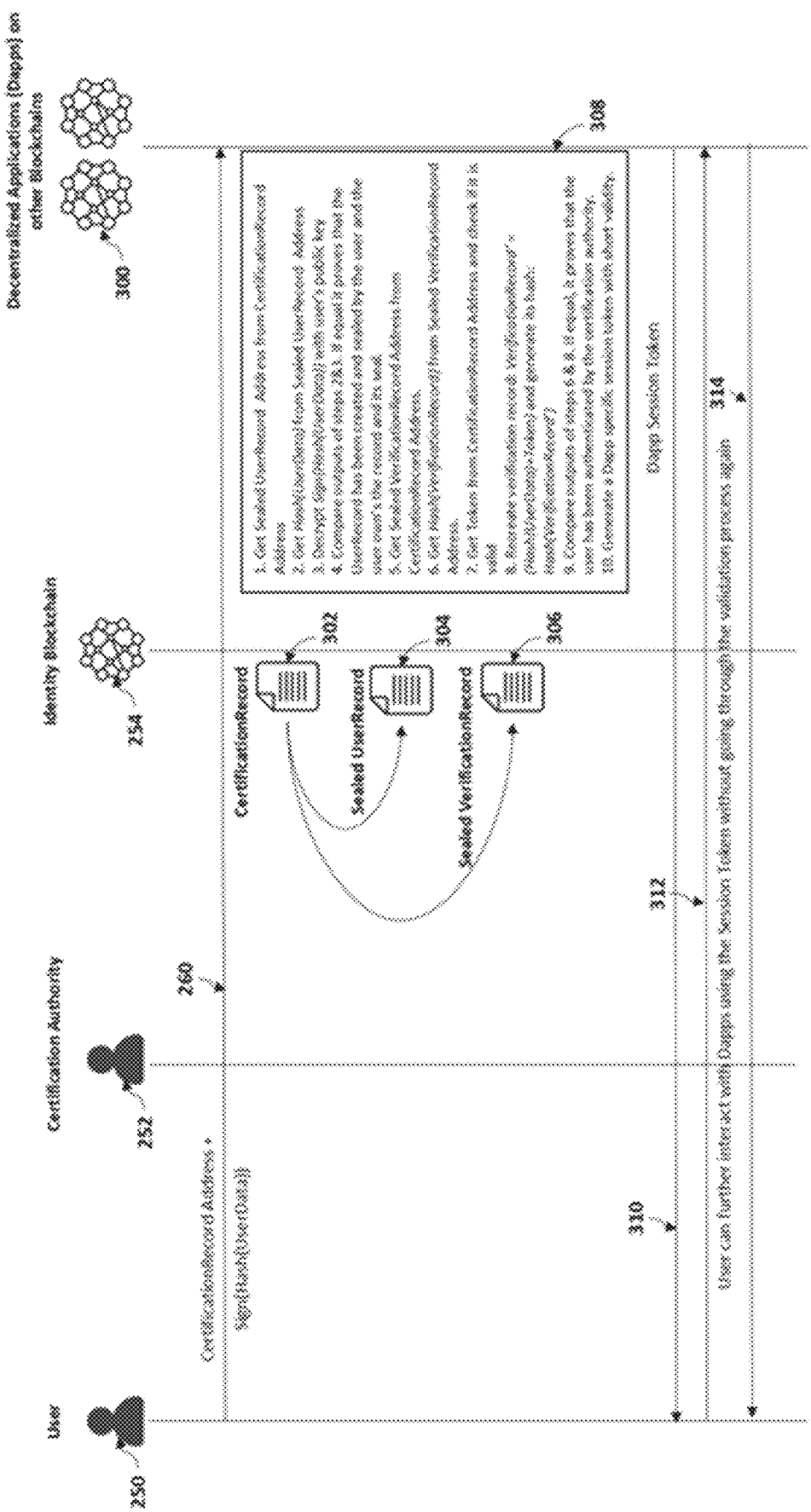
FIG. 3 is an illustration of the user validation process, according to an embodiment of the invention.

Referring to FIG. 3, a method aspect of the present invention for user validation is described in more detail. A certified user 250 can then interact with blockchain applications (either smart contracts or decentralized applications). These blockchain applications may be deployed on different blockchain networks 300. When a blockchain application requests the identity of a certified user 250, the user sends the CertificationRecord Address and the signed and hashed UserData 260 to the blockchain application. The blockchain application then carries out the validation process 308. The steps involved in the validation process 308 may include, as follows:

1. Get Sealed UserRecord Address 304 from CertificationRecord Address 302
2. Get Hash(UserData) from Sealed UserRecord Address 304
3. Decrypt Sign(Hash(UserData)) with user's public key 4. Compare outputs of steps 2 and 3. If equal it proves that the UserRecord has been created and sealed by the user and the user own's the record and its seal.

5. Get Sealed VerificationRecord Address 306 from CertificationRecord Address 6. Get Hash(VerificationRecord) from Sealed VerificationRecord Address 306

7. Get Token from CertificationRecord Address and check if it is valid

8. Recreate verification record: VerificationRecord' (Hash (UserData)+Token) and generate its hash: Hash(VerificationRecord')

9. Compare outputs of steps 6 and 8. If equal, it proves that the user has been authenticated by the certification authority.

The above steps complete the user validation process 308. Once a user has been validated, the blockchain application may generate an application specific session token 310 (with a short validity), so that the user can interact 312, 314 further with the application without going through the validation process again for each transaction. A reference implementation of Seal 350 and Certification 352 smart contracts, according to an embodiment of the invention, is shown in FIG. 4.

An embodiment of the invention provides a system and associated methods for key generation and management, where a user can generate a large number of keys in a deterministic manner for use on a single blockchain network or across multiple blockchain networks.

Referring now to FIG. 5, a hardened derivation of a child key in a Hierarchical Deterministic (HD) wallet as proposed in the Bitcoin Improvement Proposal (BIP0032) is described in more detail. An HD wallet contains a hierarchy of keys which are derived in a tree structure. The master key in an HD wallet is derived from a single root seed. HD wallets use child key derivation (CKD) functions to derive children keys from parent keys. The child private key 212 and child public key 214 are derived from the parent keys, and a chain code 202 which adds extra bits of entropy. The inputs to a CKD function 206 are a public or private key 200, a chain code 202 and an index 204. The public or private key 200 and chain code are combined to create an extended key (public or private). With a private extended key it is possible to derive the entire branch of keys in the sub-tree structure rooted at the private extended key. Whereas, with a public extended key only the public keys in the entire branch can be derived. While the ability to derive the entire branch of public keys is very useful, however, it comes at a potential risk of leaking the entire tree structure. This risk is due to the fact that the extended public key also contains the chain code. If the extended public key and a child private key descending from it are revealed, an attacker can use them to generate the parent extended private key. With this parent extended private key all the child private and public keys may be created. To counter this risk, a method of generation of 'hardened' keys is provided in HD wallet where a parent private key 200 is used to derive the child chain code 216 instead of the parent public key. A limitation of the 'hardened' child key derivation mechanism in BIP0032 is that it does not give any protection in the case of a leak of a private extended key. If a private extended key is leaked the entire sub-tree of keys can be derived.

Figure 6:
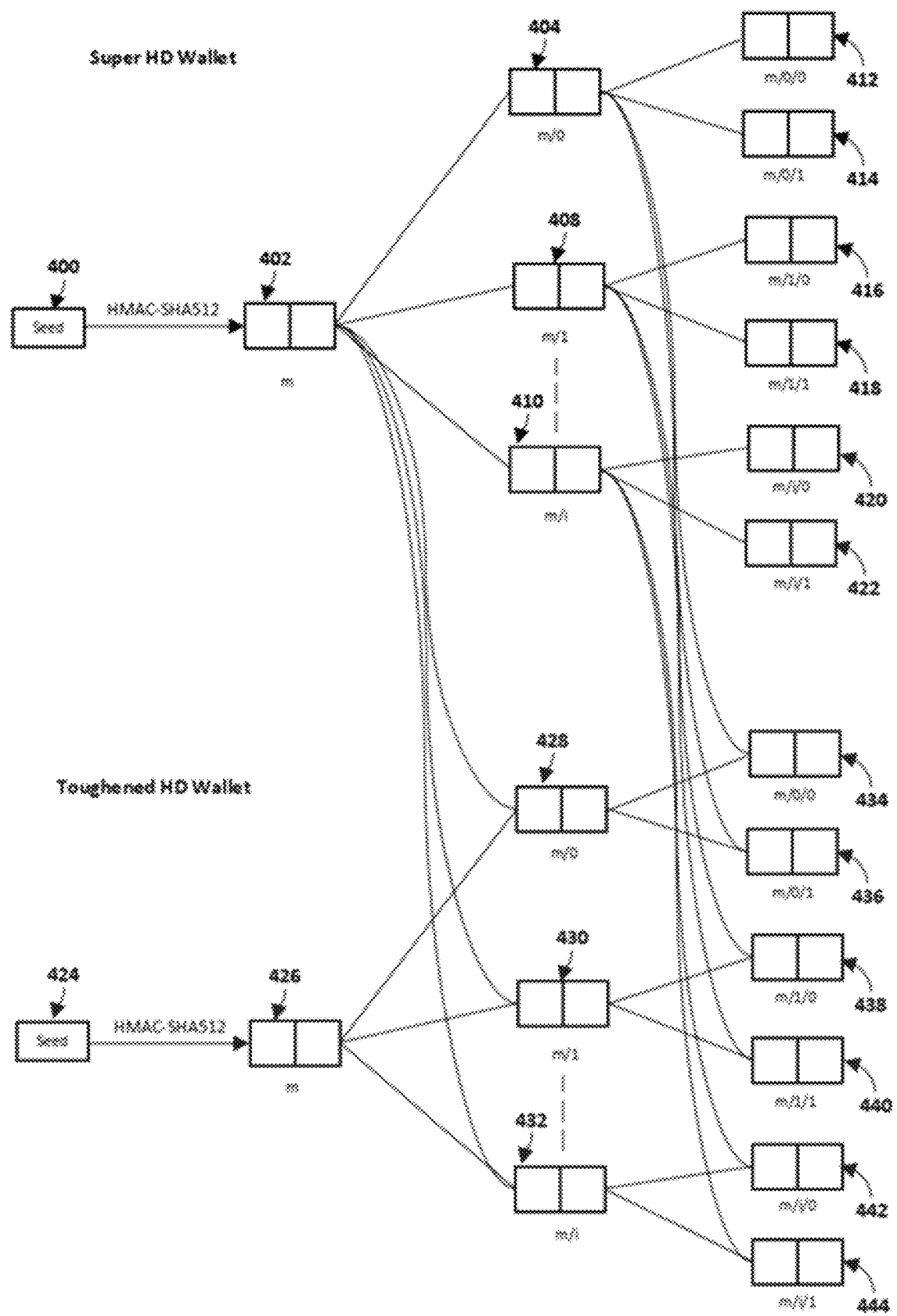
FIG. 6 is an illustration of a toughened HD wallet (an improvement over the Hierarchical Deterministic wallet as proposed in BIP0032), according to an embodiment of the invention.

Referring to FIG. 6, a method aspect of the present invention for key generation is described in more detail. We present an extension to Hierarchical Deterministic (HD) wallets, which adds additional levels of security to counter leak of private extended keys. For each user a 'Super HD Wallet' is created using the HD wallet mechanism described above. More specifically, a primary seed 400 that may comprise a parent public or private key, a parent chain code, and an index, may be received and an enhanced hierarchical deterministic wallet comprising an enhanced parent public key and an enhanced parent private key pair 402 may be generated by applying a CKD function to the primary seed 400. Additionally, the enhanced hierarchical deterministic wallet may further comprise one or more enhanced primary child public/private key pairs 404, 408, 410, where the enhanced primary child public keys is derived from the enhanced parent public key and the enhanced primary child private key is derived from the enhanced parent private key. Moreover, the enhanced hierarchical deterministic wallet may further comprise one or more enhanced secondary child public/private key pairs 412, 414, 416, 418, 420, 422 derived enhanced primary child public/private key pairs 404, 408, 410.

Next, for each blockchain network, separate Toughened HD Wallets' are created. The child keys in a Toughened HD Wallet' depend not just on their parent but also on the corresponding parent in the 'Super HD Wallet' (the key at the same path in the Super HD wallet as the parent key). More specifically, a first secondary seed 424, similar to the primary seed 400, may be received and a first toughened hierarchical deterministic wallet may be generated by deriving a first toughened parent public/private key pair 426 from the first secondary seed 424 and a first toughened primary child public/private key pair 428 from the first toughened parent public/private key pair 426. A second toughened primary child public/private key pair 430 may also be derived from the first toughened parent public/private key pair 426. Indeed, any number of toughened primary child public/private key pairs 432 may be derived. Additionally, first and second toughened secondary child public/private key pairs 434, 436 may be derived from the first toughened primary child public/private key pair 428, first and second toughened secondary child public/private key pairs 438, 440 may be derived from the second toughened primary child public/private key pair 430, and any number of toughened secondary child public/private key pairs 442, 444 may be derived from toughened primary child public/private key pairs 432.

While a single toughened hierarchical deterministic wallet is depicted, second, third, and any number of toughened hierarchical deterministic wallets, generated by respective secondary seeds and comprising toughened parent public/private key pairs and any number of primary, secondary, tertiary, and any hierarchically subsequent toughened child public/private key pairs, is contemplated and included within the scope of the invention.

The super or enhanced HD wallet keys can be derived using the same or similar approaches as in BIP32 for this. This "super" or "enhanced" HD wallet is differentiated from the other "toughened" wallets used for each blockchain network further because the "super" or "enhanced" wallet is generated for each user (e.g., are linked to the user identity) whereas "toughened" wallets are generated separately for each blockchain network account that the user's account participates in.

Figures 7, 8:
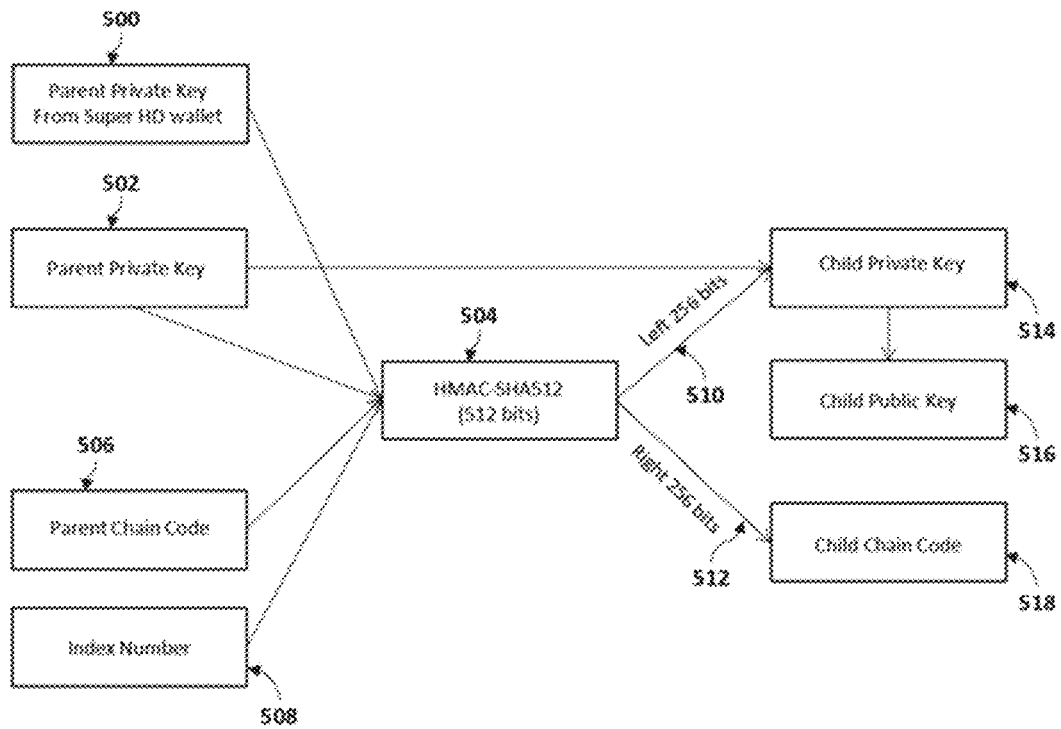
FIG. 7 is an illustration of the toughened and hardened derivation of a child key, according to an embodiment of the invention.
FIG. 8 is an illustration of the examples of toughened and hardened child key derivations, according to an embodiment of the invention.

Referring to FIG. 7, a method aspect of the present invention for the toughened and hardened key derivation will now be discussed in detail. In a normal HD Wallet the Child Key Derivation functions for private and public keys are as follows:

$CKDpriv((kpar, cpar), i) \rightarrow (ki, ci)$ $CKDpub((Kpar, cpar), i) \rightarrow (Ki, ci)$ where, child private key (ki) and child public key (Ki) depend on their parents keys and the parent chain code.

In a 'Toughened HD Wallet' enhanced child key derivation functions are proposed as follows:

$$CKDprivTough((kpar,cpar),kparsuper,i) \rightarrow (ki,ci)$$

$$CKDpubTough((Kpar,cpar),Kparsuper,i) \rightarrow (Ki,ci)$$

where, child private key (ki) 514 and child public key (Ki) 516 depend on their parents keys 502, parent chain code 506 and the corresponding key from the Super HD Wallet 502 (i.e., key at the same path as their parent), as modified by a CKD function 504. Additionally, an index number 508 may also be included in as an input to the CKD function 504. Moreover, in some embodiments, the CKD function 504 may be operable to generate a number of bits that is greater than the number of bits necessary to generate the child private key 514. For example, in the present embodiment, the CKD function 504 may generate 512 bits, where 256 bits are required for the child private key 514. Accordingly, a subset of the 512 bits generated by the CKD function 504, e.g., the "left" 256 bits 510, as is known in the art, may be used to generate the child private key 514. Additionally, the "right" 256 bits 512, as is known in the art, but in any case the bits not used to generate the child private key 514, may be utilized as a child chain code 518 for the derivation/generation of toughened child public/private key pairs.

FIG. 8 shows examples of using reference implementations of toughened and hardened child key derivation functions.

Figure 9:
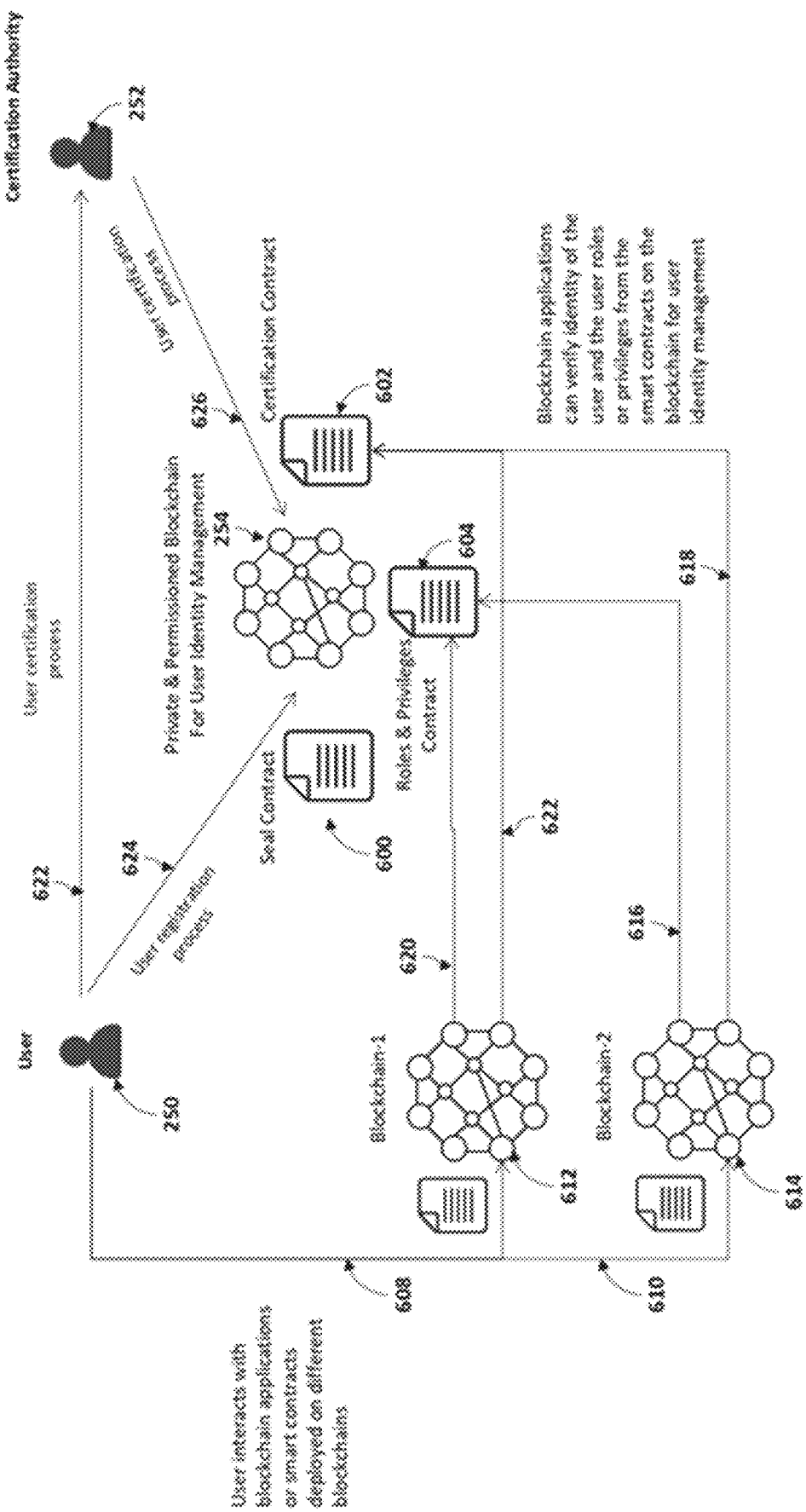
FIG. 9 is an illustration of the user interactions with multiple blockchain networks, according to an embodiment of the invention.
Figure 10:
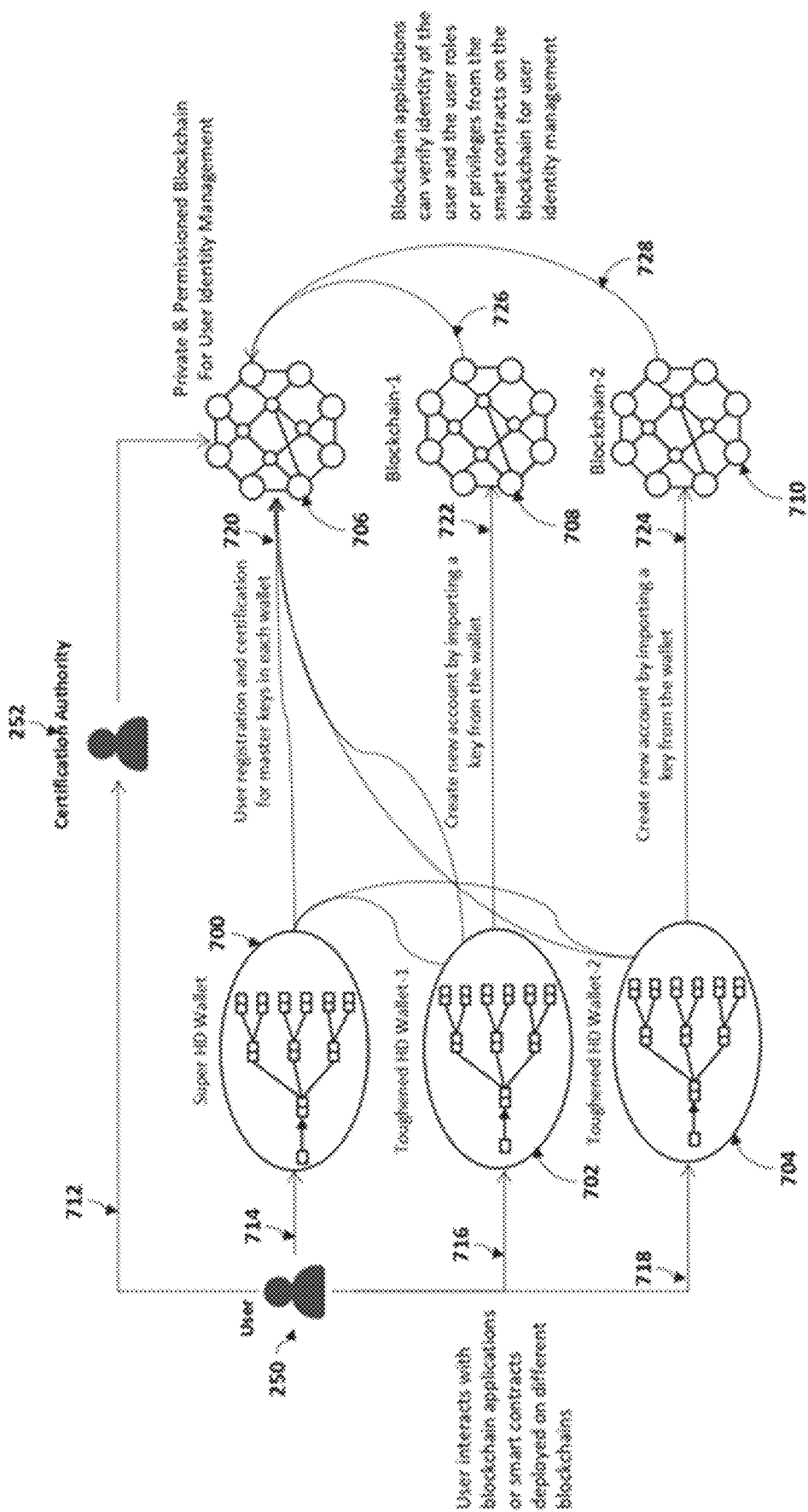
FIG. 10 is an illustration of the scenarios for using wallet keys with different blockchain networks, according to an embodiment of the invention.

An embodiment of the invention provides a system and associated methods for maintaining user identity across multiple blockchain networks. Referring to FIGS. 9 and 10, a method aspect of the present invention for maintaining user identity across multiple chains is described in more detail. For each user a 'Super HD Wallet' 700 is created 714 and separate Toughened HD Wallets' 702, 704 are created 716, 718 for separate blockchain networks 612/708, 614/710. The user registration process 624 needs to be done only once for a user, generating a seal contract 600 as described hereinabove. The certification process 626/720 can be carried out once for the Super HD wallet and then for each Toughened HD wallet, generating a certification contract 602 as described hereinabove. Once a master key in a HD wallet (Super or Toughened) has been certified for a user, the ownership of a child key can verified by sharing the derivation path from master to child key without the need to through the whole certification and validation process again when the master key is already certified. To use a child key from a Toughened HD wallet on a blockchain network, the user creates a new blockchain account by importing 722, 724 the key 608, 610 from the Toughened HD Wallets 702, 704. The identity of the user may be verified 726, 728 by the blockchain networks 612/708, 614/710 accessing 622, 618 the certification contract 602.

The derived child keys in a Toughened HD wallet' can be used in several ways, described as follows:

1) In one embodiment, the child public keys can be used for receiving funds and the private keys are required for spending funds.

2) In another embodiment, new child keys can be derived and used for each session or each transaction.

3) In another embodiment, specific roles and privileges can be assigned to specific child keys or specific sub-trees in a Toughened HD wallet. A smart contract 604 on the user identity blockchain can maintain a mapping from the child keys to specific roles and privileges. The smart contract 604 may function to ensure requests 620, 616 made by the respective blockchain networks 612, 614 comply with the specific roles and privileges made for those blockchain networks.

4) In another embodiment, a smart contract can be used to maintain a mapping from the child keys to their respective timeout periods.

5) In another embodiment, a smart contract can be used to control key reuse, where a key can be allowed to be used for a limited number of transactions only.

6) In another embodiment, smart contracts can be used for information sharing on the user accounts across different blockchain networks.

The proposed methods of maintaining user identity across multiple blockchain networks, can prevent a rogue user from accessing blockchain applications by impersonating a real user. While a rogue can try to generate one or more HD wallets (with normal or hardened keys) and attempt to access blockchain applications on different chains, however, since these applications require the user's master keys to be certified, they will reject access to the user when the validation process is performed as there will be no linked Super HD wallet for which a certification exists on the identity blockchain.

Figure 11:
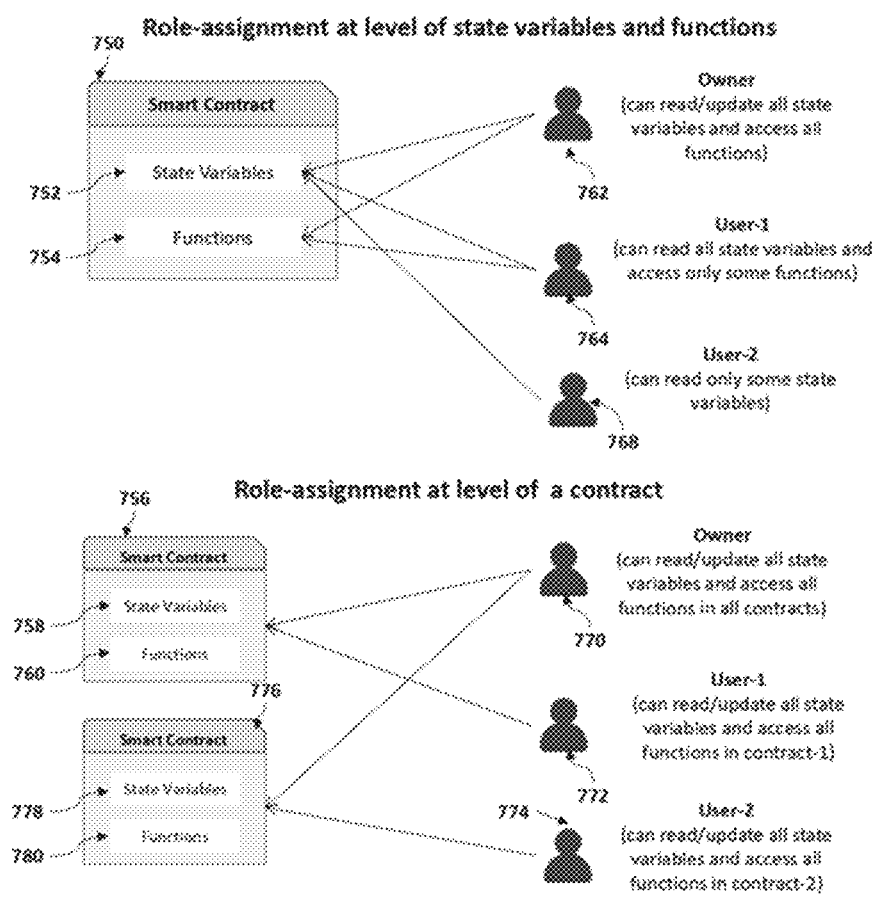
FIG. 11 is an illustration of the examples of roles based access control with different roles assigned to different users, according to an embodiment of the invention.
Figure 12:
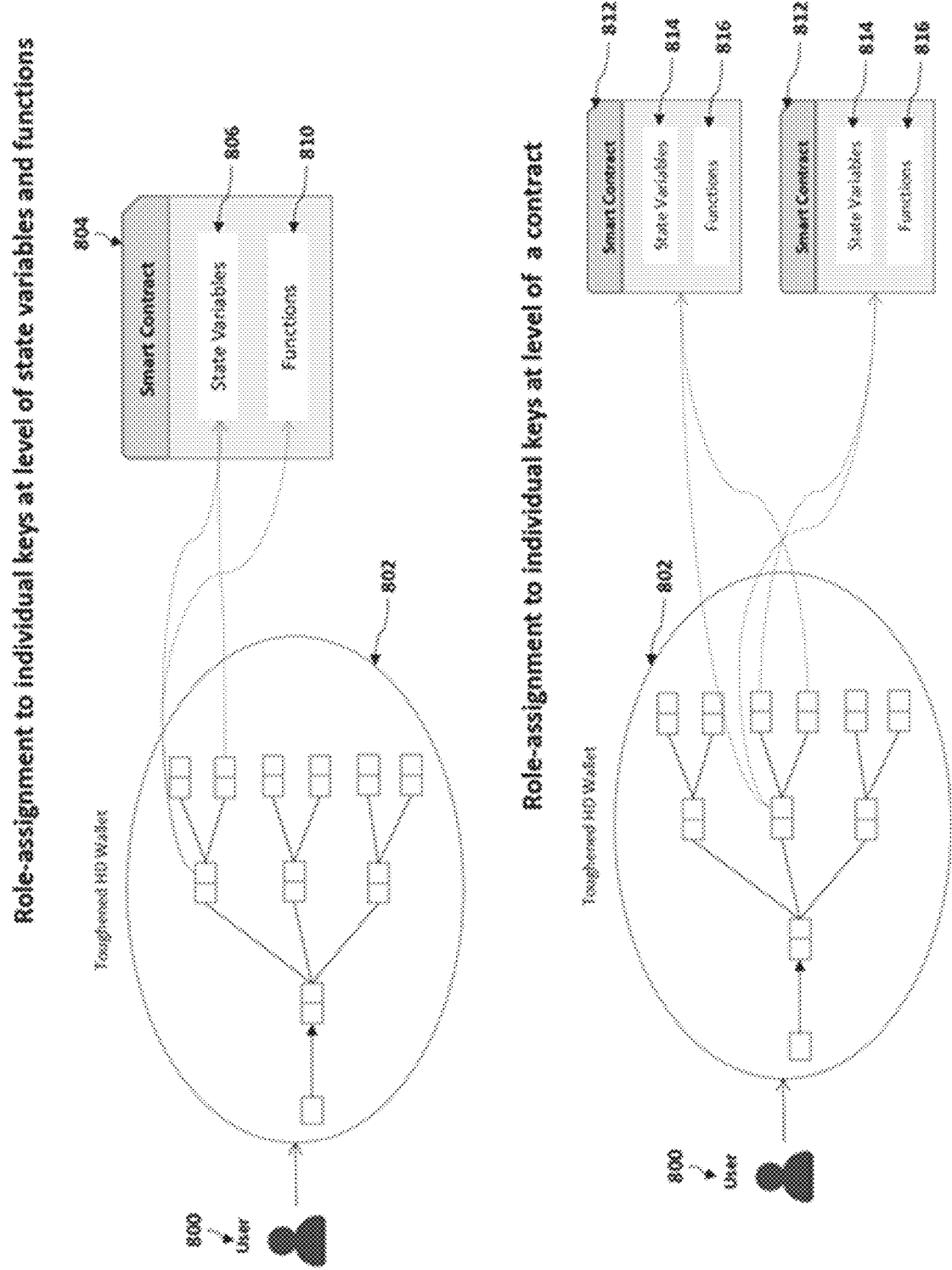
FIG. 12 is an illustration of the examples of roles based access control, with role assignment to individual keys belonging to a user, according to an embodiment of the invention.

An embodiment of the invention provides a system and associated methods for role-based access control in blockchain applications. Referring to FIGS. 11 and 12, a method aspect of the present invention for role-based access control is described in more detail. Role-based access control for blockchain applications is used to restrict access to authorized users. The role-based access control system allows defining roles and policies which control access to the blockchain applications and their associated smart contracts. A role is a set of permissions which grant access to particular resource of a blockchain application (for example, a state variable or a function in the smart contract, or a collection of smart contracts). Policies are attached to roles which define the permissions for the roles. The information about roles and policies for a blockchain application may be maintained in a smart contract on the identity blockchain. Role assignments maybe done in the following ways:

1) In one embodiment, as shown in FIG. 11, where a blockchain application has a single smart contract 750 (that includes a set of state variables 752 and functions 754), the role assignments may be done to specific state variables 752 and functions 754. For example, a user in the role of a contract owner 762 would have access to read and update all state variables 752 and access all the functions 754 of the smart contract 750. Whereas, other users 764, 768 may have access to only a subset of the state variables and functions.

2) In another embodiment, as shown in FIG. 11, where a blockchain application has multiple smart contracts 756, 776 the role assignments may be done at the level of smart contracts. For example, a user in the role of the application owner 770 would have access to read and update all state variables 758, 778 and access all the functions 760, 780 in all the smart contracts 756, 776 in the application. Whereas, other users 772, 774 may have access to only certain smart contracts in the application.

3) In another embodiment, as shown in FIG. 12, different roles may be assigned to different child keys belonging a certified user 800. For example, a derived key at path m/0/1 in the user's toughened HD wallet 802 may be allowed to access all the state variables 806 and functions 810 in a smart contract 804 and, alternatively, all state variables 814, 814' and functions 816, 816' in smart contracts 812, 812', whereas a derived key at path m/0/0/1 in the user's toughened HD wallet 802 may be allowed to access only a subset of state variables and functions, e.g. either state variables 814 and functions 816 of smart contract 812 or state variables 814' and functions 816' of smart contract 812'.

4) In another embodiment, additional constraints (at the contract or application-level) may be defined within the policies attached to roles. For example, in a case of a voting application on the blockchain, a user may be allowed to vote only once (i.e., send a transaction to the vote function of the smart contract only once).

Figure 13:
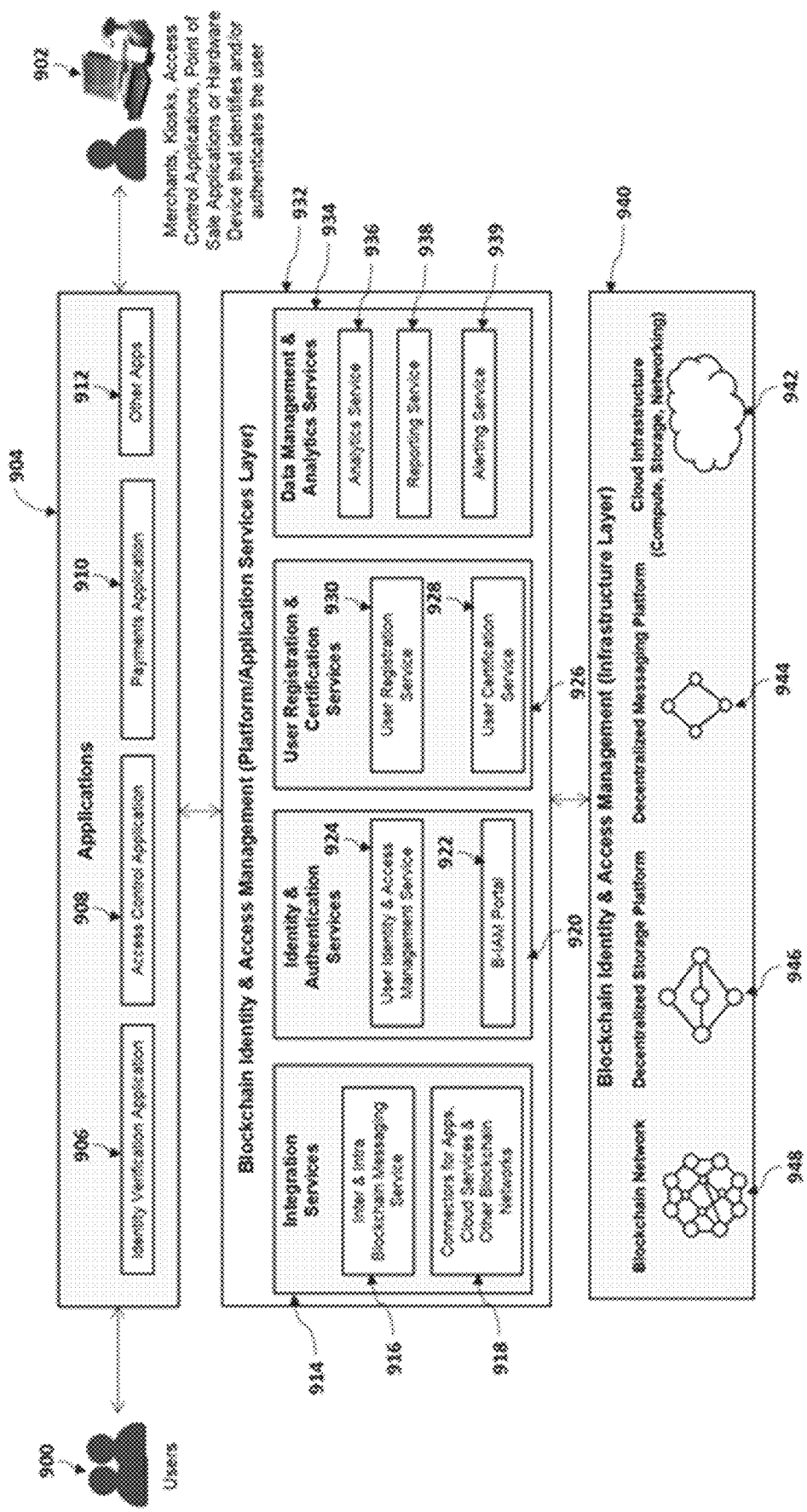
FIG. 13 is a schematic diagram of a blockchain identity and access management system (B-IAM), according to an embodiment of the present invention.

Referring to FIG. 13, a blockchain identity and access management system (B-IAM) system according to an embodiment of the present invention is now described in detail. The B-IAM system's infrastructure layer 940 comprises a blockchain network 948, a decentralized storage platform 946, decentralized messaging platform 944 and cloud infrastructure 942. All the smart contracts related to user identity management (such as the Seal Contract, Certification Contract, Roles & Privileges Contract) deployed on the blockchain network 948. For 948, a blockchain platform such as Ethereum can be used. The decentralized messaging platform 944 is used for messaging between the decentralized applications (Dapps), which are built on the B-IAM system. For 944, a decentralized messaging platform such as Whisper, can be used. Whisper messages are transient in nature and have a time-to-live (TTL) set. Each message has one or more topics associated with it. The Dapps running on a blockchain node inform the node about the topics to which they want to subscribe. Whisper uses topic-based routing where the nodes advertise their topics of interest to their peers. Topics are used for filtering the messages which are delivered to a node which are then distributed to the Dapps running on the blockchain node. The decentralized storage platform 944 is used for storing user data such as user photos, and scanned identity documents. For 946, a decentralized storage platform such as Swarm can be used. Swarm is a decentralized storage platform and content distribution service for the Ethereum blockchain platform. Swarm is a peer-to-peer storage platform which is maintained by the peers who contribute their storage and bandwidth resources. Swarm has been designed to dynamically scale up to serve popular content and has a mechanism to ensure the availability of the content which is not popular or frequently requested. The cloud infrastructure 942, is used for collection, storage and analysis of application usage data.

The B-IAM system's platform and application services layer 932 comprises Integration Services 914, Identity & Authentication Services 920, User Registration & Certification Services 926, Data Management & Analytics Services 934. The Integration Services 914, comprise Inter-Blockchain and Intra-blockchain Messaging Services 916, and various connectors for applications, cloud services and other blockchain networks 918. The Identity & Authentication Services 920 comprise a User Identity & Access Management Service 924, and a B-IAM portal 922. The B-IAM portal 922 allows users 900 to access and monitor their identity data recorded in the B-IAM system and view identity requests made by different applications. The User Registration & Certification Services 926 comprise a User Registration Service 930 (which is used for the process flow as shown in FIG. 2) and a User Certification Service 928 (which is used for the process flow as shown in FIG. 3). The Data Management & Analytics Services 934, are deployed on the cloud infrastructure 942. These include an analytics service 936, reporting service 938, and an alerting service 939. The analytics service 936, can analyze multi-blockchain behavior of a user account to ensure compliance. It is contemplated and included within the scope of the invention that all of these platforms and applications services are operable on a computerized device comprising a processor, a network communication device, and a data storage device as described hereinabove.

The B-IAM system can be used for providing identity, access management and authentication services for a wide range of applications 904. Some exemplary applications that can benefit from the B-IAM system include an identity verification application 906, access control application 908 and a blockchain-based payments application 910. All of these may communicate with third party devices and applications 902 that identifies and/or authenticates the users 900.

Figure 14:
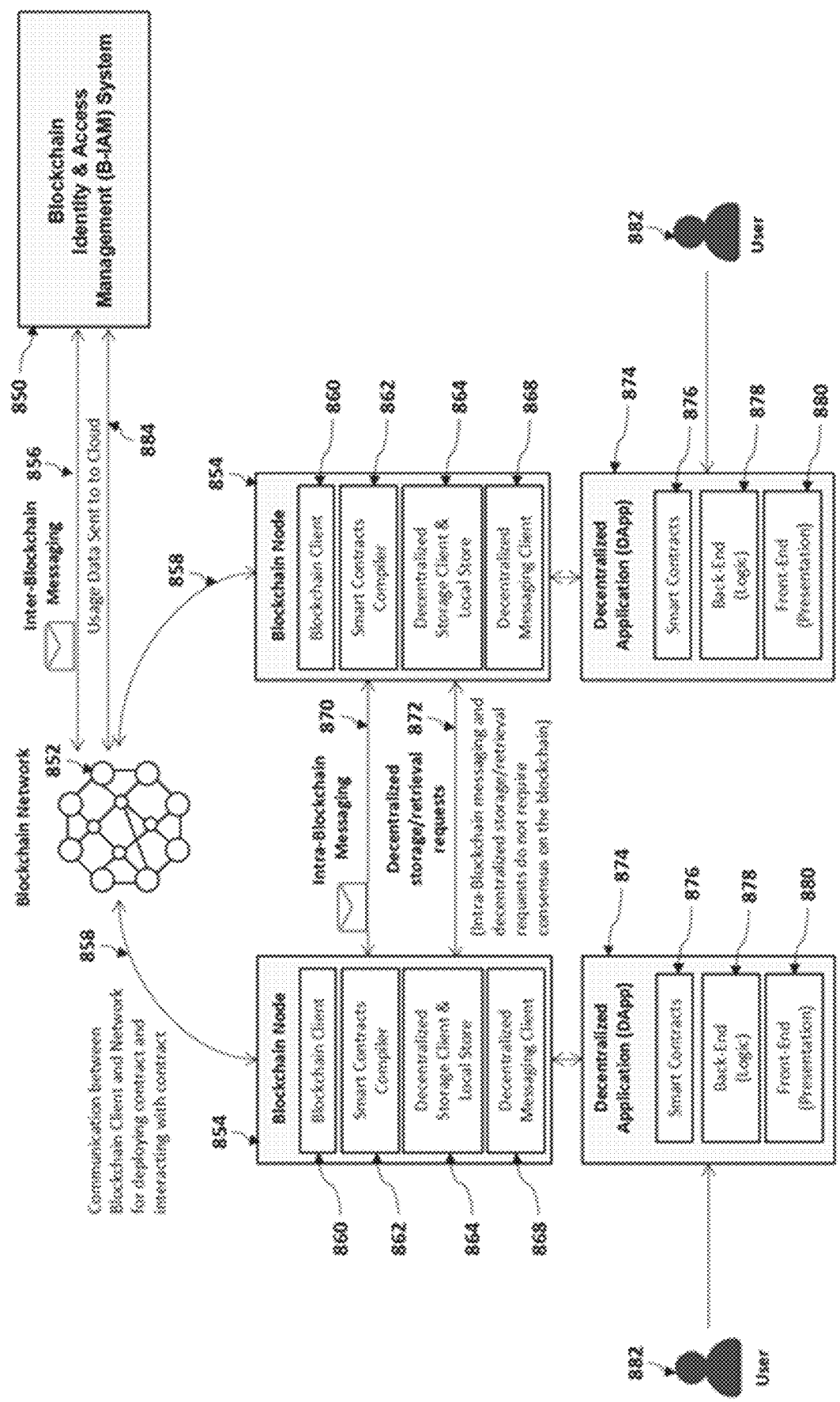
FIG. 14 is an illustration of the interactions between the B-IAM system and other blockchain networks and decentralized applications, according to an embodiment of the present invention.

Referring to FIG. 14 the interactions between the B-IAM system 850 and other blockchain networks 852 and decentralized applications 874, according to an embodiment of the present invention are now described in detail. The B-IAM system can be used to provide user identity and access management services for various decentralized applications deployed on different blockchain networks. The B-IAM allows a user to work on multiple blockchain networks, or multiple applications deployed on the same blockchain networks, while maintaining the same identity. The blockchain network 852 can communicate 858 with the B-IAM system using an Inter-Blockchain Messaging protocol 856. The blockchain network 852 can also send usage data 884 (such as application usage and user interactions data) to the B-IAM system. Applications deployed on a blockchain network 852 are either in the form of smart contracts 876 or Dapps 874. A smart contract is a piece of code which is deployed on the blockchain network and is uniquely identified by an address. While smart contracts can directly be used by end users 882 who can send transactions or calls to the smart contracts through blockchain clients, however, to provide a more user-friendly interface to smart contracts, Dapps can be developed and applied over these smart contracts. A Dapp 874 includes one or more associated smart contracts 876, a front-end user interface 880 (which is typically implemented in HTML and CSS) and a back-end 878 (which is typically implemented in JavaScript). Users can submit transactions to the smart contract 876 associated with a Dapp from the Dapp's web interface itself. The Dapp's web interface forwards the transactions to the blockchain platform 852 and displays the transaction receipts or state information in the smart contracts in the web interface. A Dapp is deployed on a blockchain node 854 which serves the Dapp's web-based user interface. The Dapp logic is controlled by the associated smart contracts 876 which are deployed on the blockchain platform 852. Dapps which have special storage requirements can make use of a decentralized storage platform (such as Swarm). Similarly, Dapps which have special messaging requirements can leverage a decentralized messaging platform (such as Whisper). A blockchain node 854 typically comprises a blockchain client 860 that sends transactions to the blockchain network 852, a smart contracts compiler 862, a decentralized storage client & local store 864, and a decentralized messaging client 868. While the smart contracts are deployed on the blockchain network, Intra-blockchain messaging 870 (over a decentralized messaging platform) and decentralized storage/retrieval requests 872 (over a decentralized storage platform) work off the chain as they do not require a consensus on the blockchain.

Figure 15:
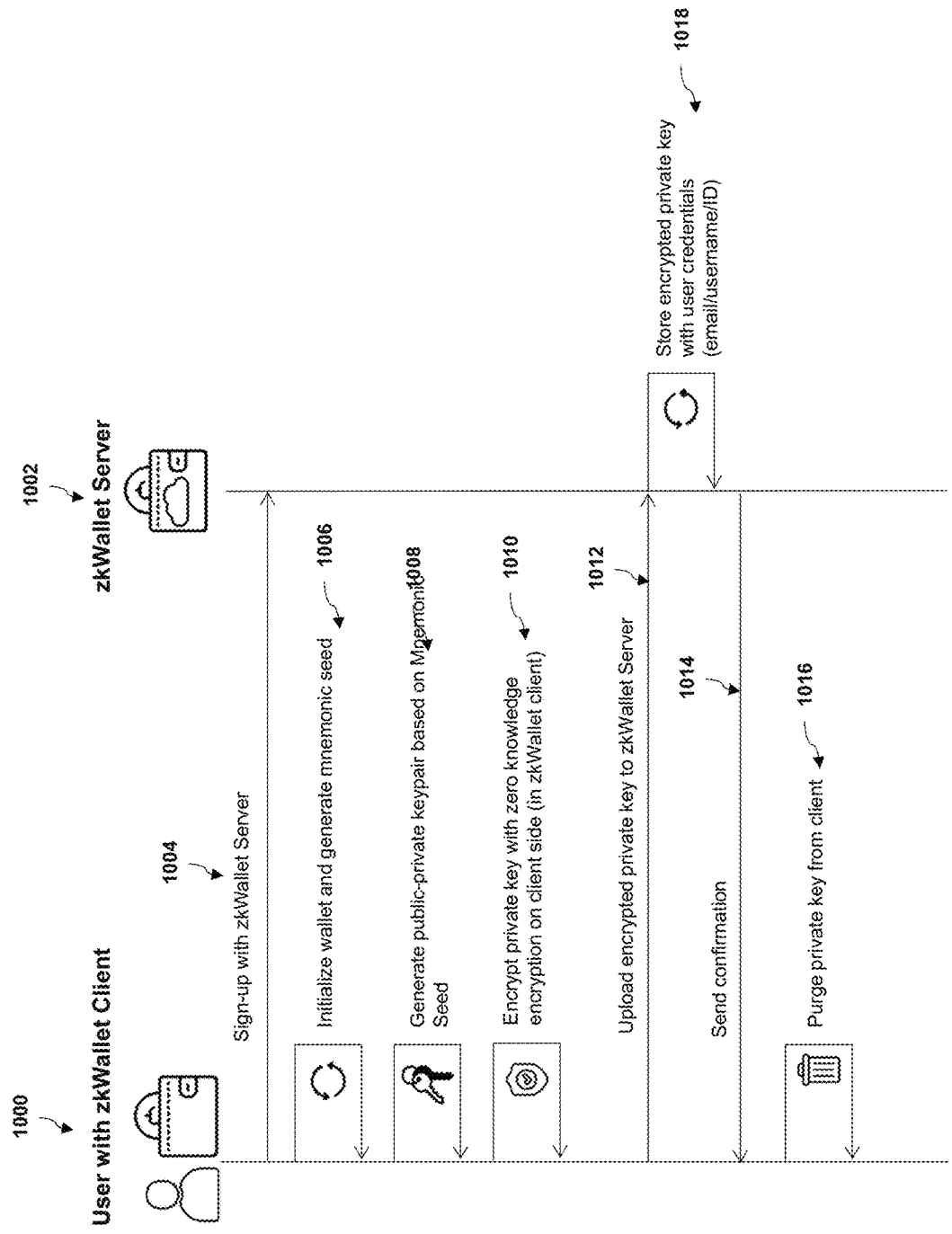
FIG. 15 is an illustration of a method of wallet setup and key generation with zkWallet according to an embodiment of the invention.

Referring to FIG. 15, an illustration of the process of wallet setup and key generation with zkWallet, according to an embodiment of the present invention is now described in detail. A User with zkWallet client application 1000 sends a request 1004 to sign-up with zkWallet server. At the next step, 1006, the wallet is initialized and a random mnemonic seed is generated. At the next step, 1008, a public-private keypair is generated based on the mnemonic seed. At the next step, 1010, the private key is encrypted with zero knowledge encryption on client side (in zkWallet client). At the next step, 1012, the encrypted private key is uploaded to zkWallet Server. The zkWallet Server stores the encrypted private key with user credentials (email/username/ID) at the next step 1018. The zkWallet Server sends confirmation to the zkWallet client at step 1014. The private is then purged from the zkWallet client at step 1016.

Figure 16:
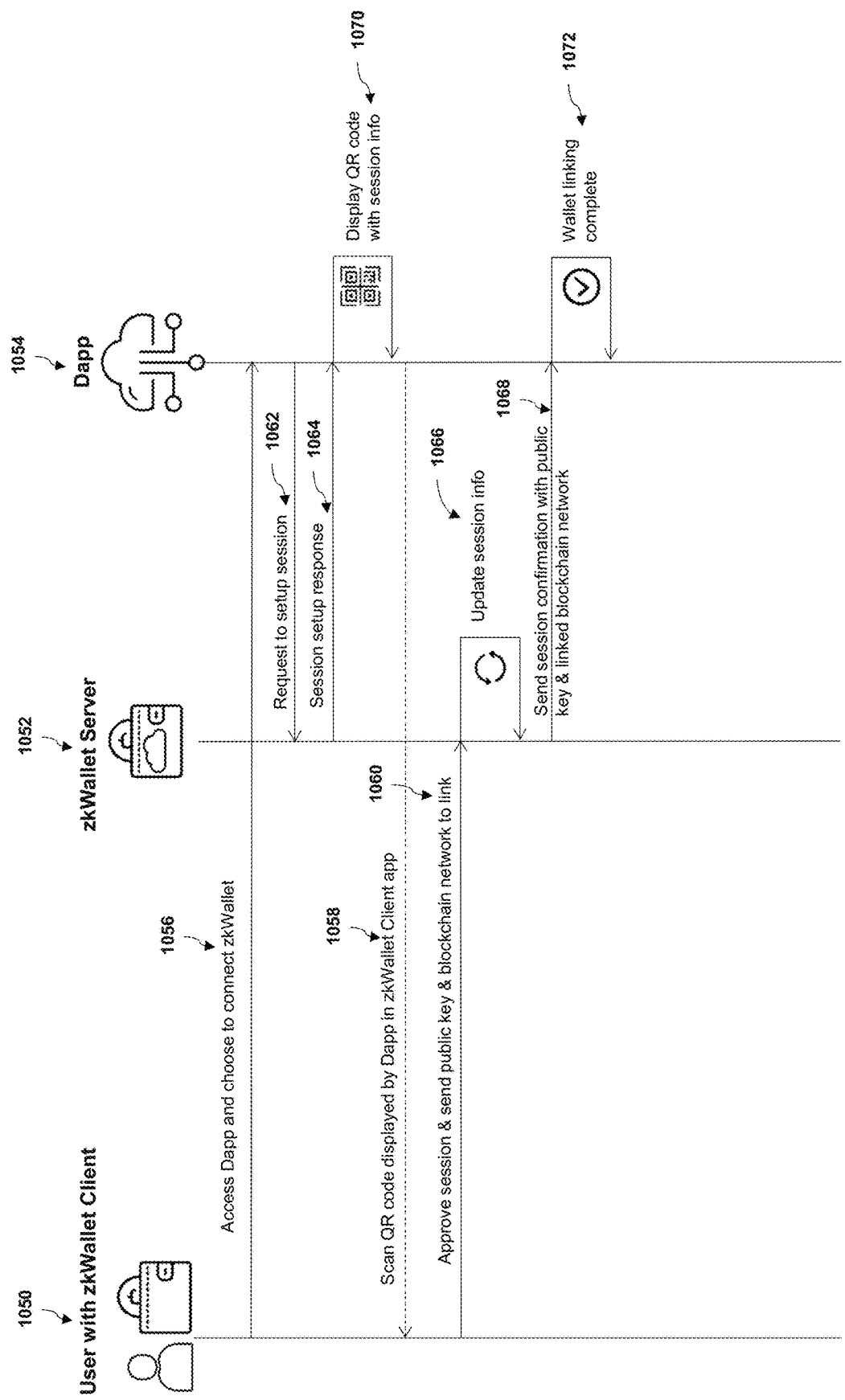
FIG. 16 is an illustration of a mothed of linking a zkWallet with a decentralized application according to an embodiment of the invention.

Referring to FIG. 16, an illustration of the process of linking a zkWallet with a decentralized application, according to an embodiment of the present invention is now described in detail. A User with zkWallet client application 1050 sends a request 1056 to access a Dapp 1054 and chooses to connect zkWallet within the Dapp. The Dapp 1054 sends a request to the zkWallet Server 1052 to set up a new session at step 1062. The zkWallet Server 1052 sets up a session and sends a response to the Dapp at step 1064. The Dapp displays a QR code with session info at step 1070. While a QR code facilitates conveying information into the zkWallet client application, it is contemplated and included within the scope of the invention that the session information may be provided to the user 1050 by any means or method as is known in the art. The User with zkWallet client application 1050 scans the QR code displayed by Dapp 1054 in zkWallet Client application. The User with zkWallet client application 1050 then approves the session and sends the public key & blockchain network to link at step 1060. The zkWallet Server 1052 updates the session info with the public key and blockchain network selected by the user at step 1066. The zkWallet Server 1052 sends session confirmation with public key and linked blockchain network information to the Dapp 1054 at step 1068. The Dapp 1072 then completes the linking process and displays the connected user account and linked blockchain network at step 1072.

Figure 17:
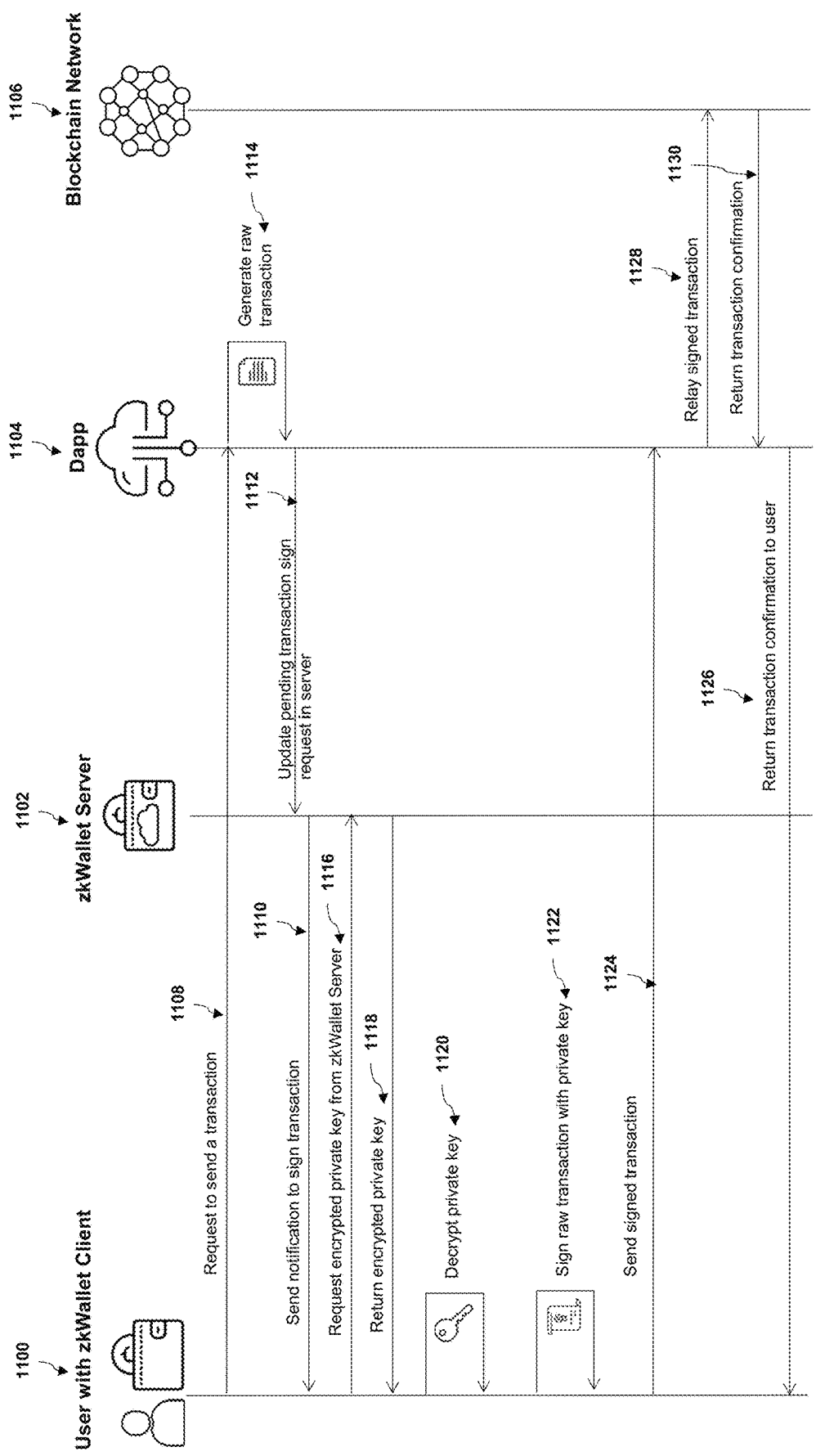
FIG. 17 is an illustration of a method of signing and sending transactions with zkWallet according to an embodiment of the invention.

Referring to FIG. 17, an illustration of the process of signing and sending transactions with zkWallet, according to an embodiment of the present invention is now described in detail. A User with zkWallet client application 1100 sends a request to send a transaction to the Dapp 1104 at step 1108. The Dapp 1104 generates a raw transaction at step 1114. The Dapp 1104 updates a pending transaction sign request in the zkWallet server 1102 at step 1112. The zkWallet server 1102 sends a notification to the zkWallet client 1100 to sign the transaction at step 1110. The zkWallet client 1100 requests the encrypted private key from zkWallet server 1102 at step 1116. The zkWallet server 1102 returns the encrypted private key at step 1118. The zkWallet client 1100 decrypts the private key at step 1120. The user signs the raw transaction with private key in the zkWallet client app 1100 at step 1122. The zkWallet client 1100 sends the signed transaction to the Dapp 1104 at step 1124. The Dapp 1104 relays the signed transaction to the blockchain network 1106 at step 1128. The blockchain network 1106 returns a transaction confirmation to the Dapp 1104 at step 1130. The Dapp 1104 returns the transaction confirmation to the user 1100 at step 1126.

Figure 18:
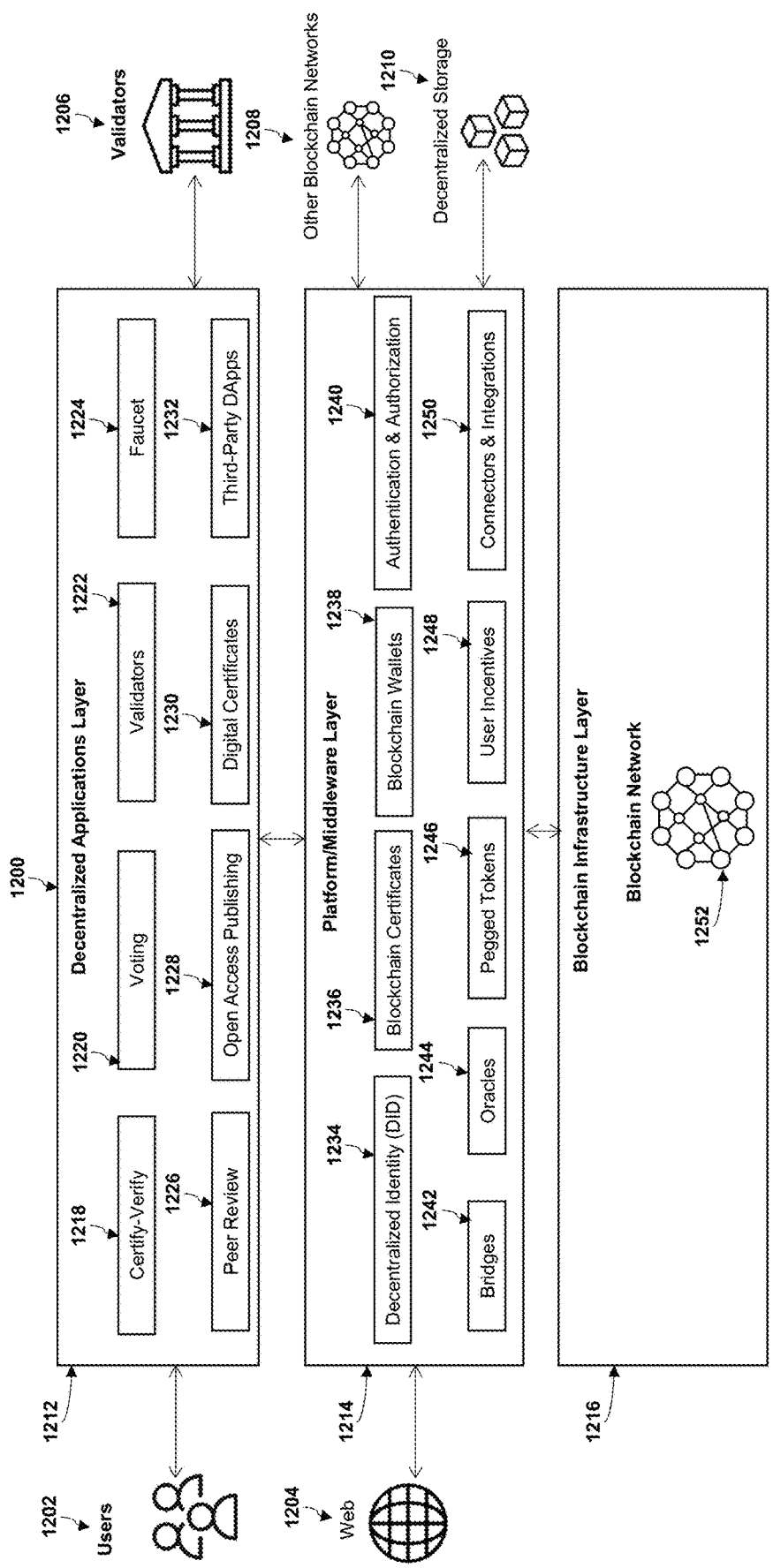
FIG. 18 is a schematic representation of a middleware/platform layer with decentralized identity according to an embodiment of the invention.

Referring to FIG. 18, an illustration of middleware/platform layer with decentralized identity, according to an embodiment of the present invention is now described in detail. A Platform/Middleware Layer 1214 is developed on top of the blockchain infrastructure layer 1216 that comprises a blockchain network 1252. The Platform/Middleware Layer 1214 comprises services/components/modules such as Decentralized Identity (DID) 1234, Blockchain Certificates 1236, Blockchain Wallets 1238, Authentication & Authorization 1240, Bridges 1242, Oracles 1244, Pegged Tokens 1246, User Incentives 1248, and Connectors & Integrations 1250. The Connectors & Integrations 1250 allow connections to external blockchain networks 1208 and Decentralized Storage networks 1210. A Decentralized Applications Layer 1200 is developed on top of the Platform/Middleware Layer 1214, comprising various decentralized applications (Dapps) such as Certify-Verify 1218, Voting 1220, Validators 1222, Faucet 1224, Peer Review 1226, Open Access Publishing 1228, Digital Certificates 1230 and Third-Party DApps 1232. The key benefits of the Platform/Middleware Layer 1214 include a common platform/middleware layer is used by multiple Dapps, users 1202 can carry the same verified identity across Dapps, users can link their Blockchain DID with ORCiD or other identifiers, it can help in wider adoption of a blockchain network as Dapps can use common services, users get option of custodial or non-custodial wallets, support for pegged/stable tokens 1246, user incentives offered through tokens and shared across Dapps, and integrations with other blockchains 1208 and the web 1204 made easier through Bridges 1242 and Oracles 1244.

Figure 19:
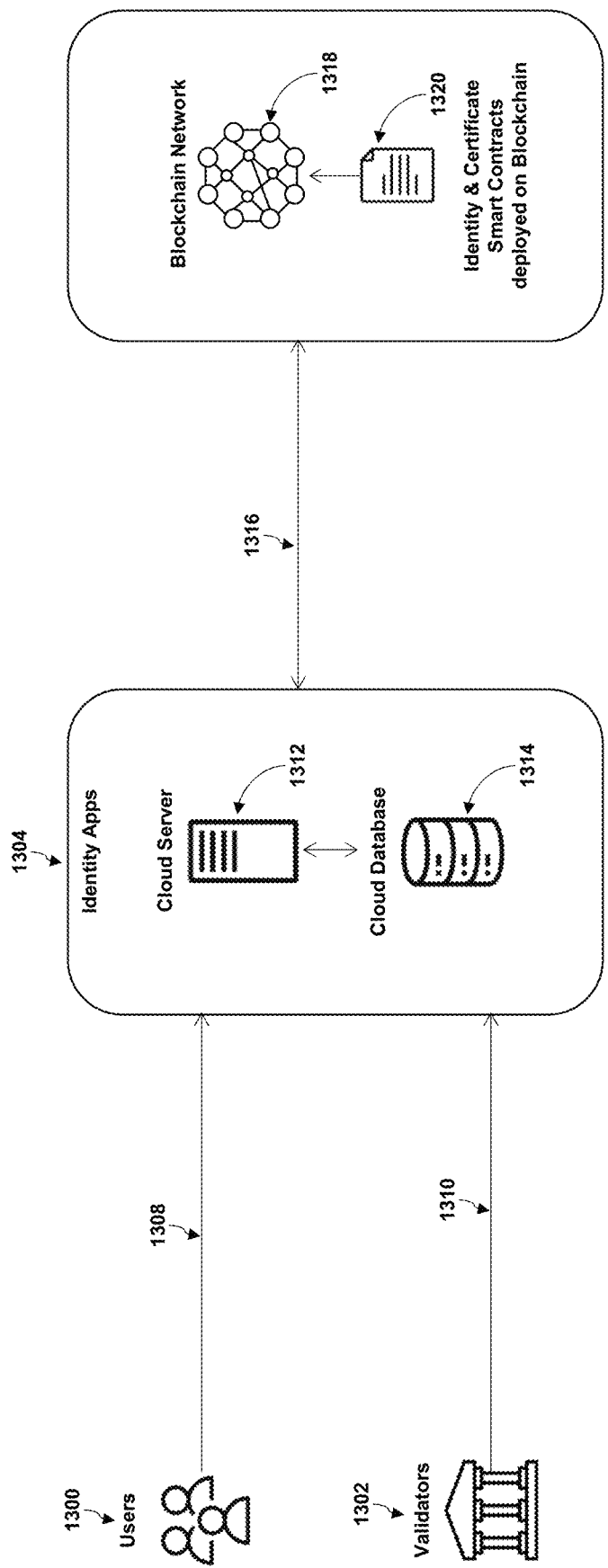
FIG. 19 is a schematic representation of an exemplary deployment of identity applications and smart contracts according to an embodiment of the invention.

Referring to FIG. 19, an illustration of an exemplary deployment of identity applications and smart contracts, according to an embodiment of the present invention is now described in detail. The users 1300 and validators 1302 access 1308, 1310 and use the identity applications 1304 deployed in the cloud on a cloud server 1312 and cloud database 1314. The cloud server 1312 further connects 1316 to a blockchain network 1318 on which the identity and certificate smart contracts 1320 are deployed.

Figure 20:
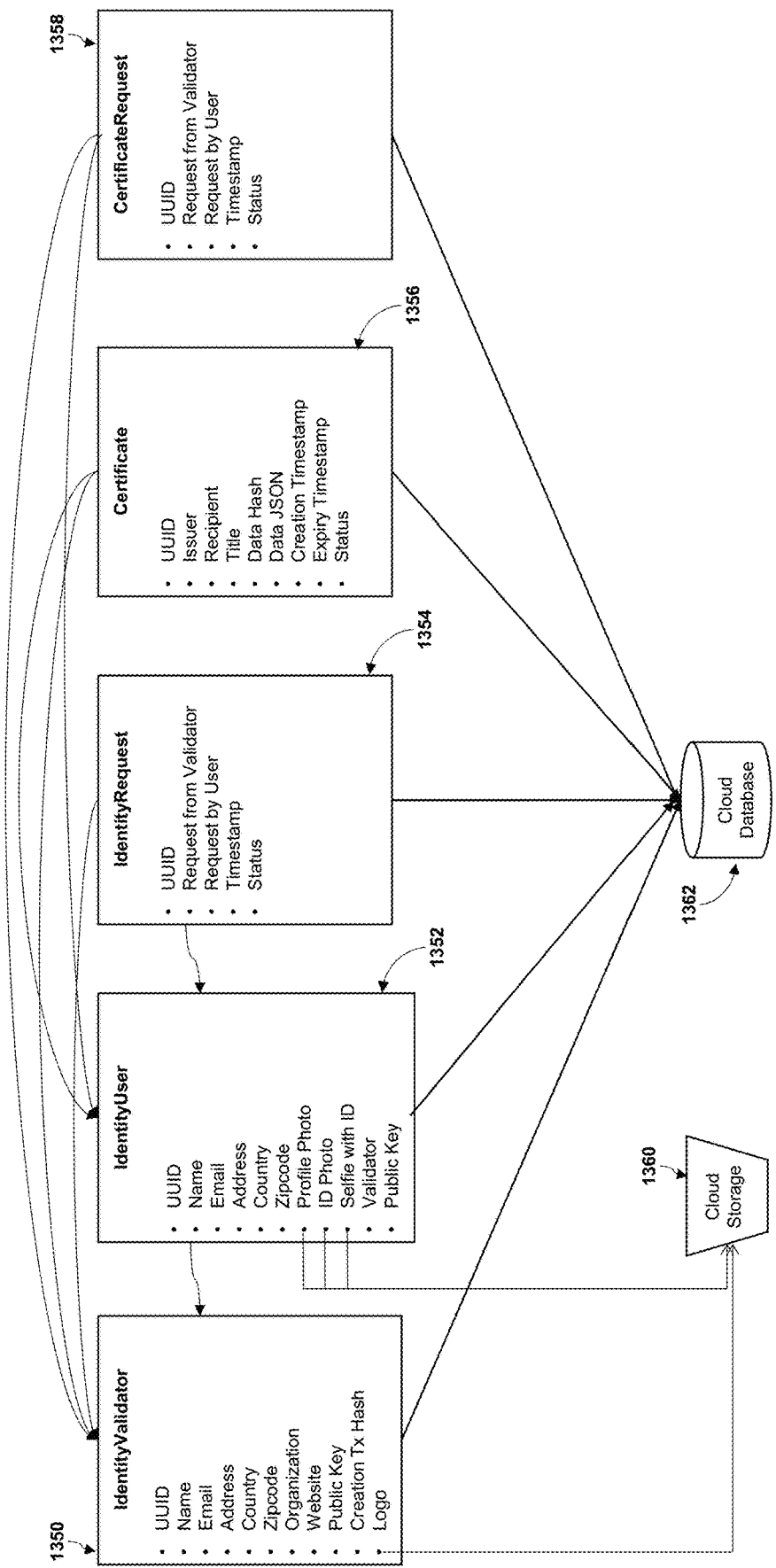
FIG. 20 is an illustration of an exemplary data model and tables used for storing identity and certificates information according to an embodiment of the invention.

Referring to FIG. 20, an illustration of an exemplary data model and tables used for storing identity and certificates information, according to an embodiment of the present invention is now described in detail. The IdentityValidator table 1350 maintains records of validators. The IdentityUser table 1352 maintains records of users who request their identity to be verified on the blockchain. The IdentityRequest table 1354 maintains records of identity requests placed by users. The Certificate table 1356 maintains records of certificates issued by the validators. The CertificateRequest table 1358 maintains records of the certificate requests sent by users to validators. The IdentityValidator table 1350, IdentityUser table 1352, IdentityRequest table 1354, Certificate table 1356 and CertificateRequest table 1358 are stored in a cloud database 1362 and the image and other file objects linked to these tables are stored in a cloud storage 1360.

Figure 21:
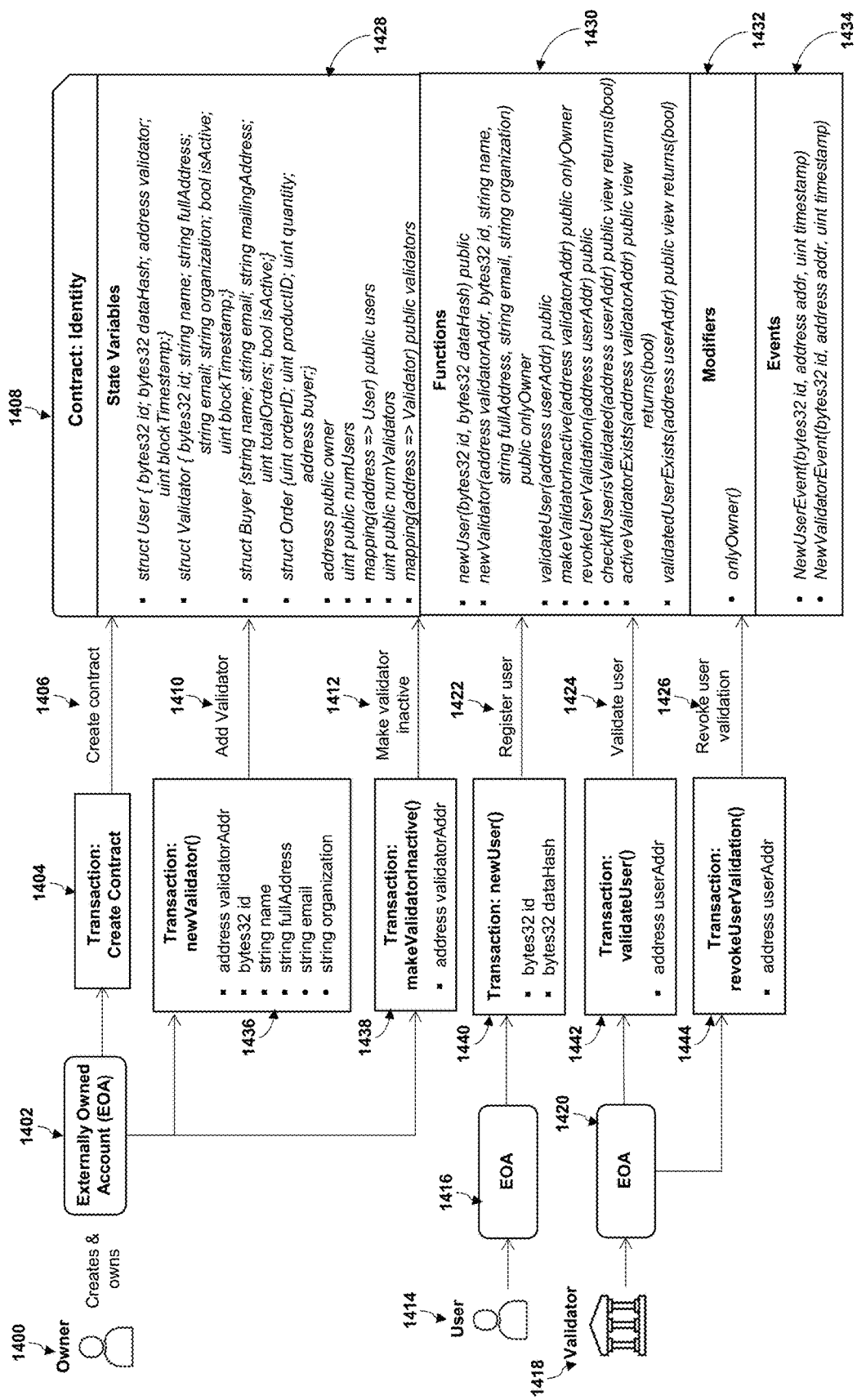
FIG. 21 is an illustration of an exemplary identity smart contract according to an embodiment of the invention.

Referring to FIG. 21, an illustration of an exemplary identity smart contract, according to an embodiment of the present invention is now described in detail. The Identity smart contract 1408 contains state variables 1428, functions 1430, modifiers 1432 and events 1434. The Owner 1400 of the Identity smart contract 1408 deploys the contract to a blockchain network by sending 1406 a contract creation transaction 1404 from the Externally Owned Account (EOA) 1402 linked to the Owner 1400. The Owner 1400 creates a new validator by sending 1410 a transaction 1436 to the newValidator( ) function of the identity smart contract 1408. The Owner 1400 can make a validator inactive by sending 1412 a transaction 1438 to the makeValidatorInactive( ) function of the identity smart contract 1408. A user 1414 can register with the identity smart contract 1408 by sending 1422 a transaction 1440 to the newUser( ) function of the smart contract 1408 from an EOA 1416 owned by the user 1414. A validator 1418 can validate a user 1414 by sending 1424 a transaction 1442 to the validateUser( ) function of the identity smart contract 1408 from an EOA 1420 owned by the validator 1418. The validator 1418 can revoke the validation of a user 1414 by sending 1426 a transaction 1444 to the revokeUserValidation( ) function of the identity smart contract 1408 from its EOA 1420.

Figure 22:
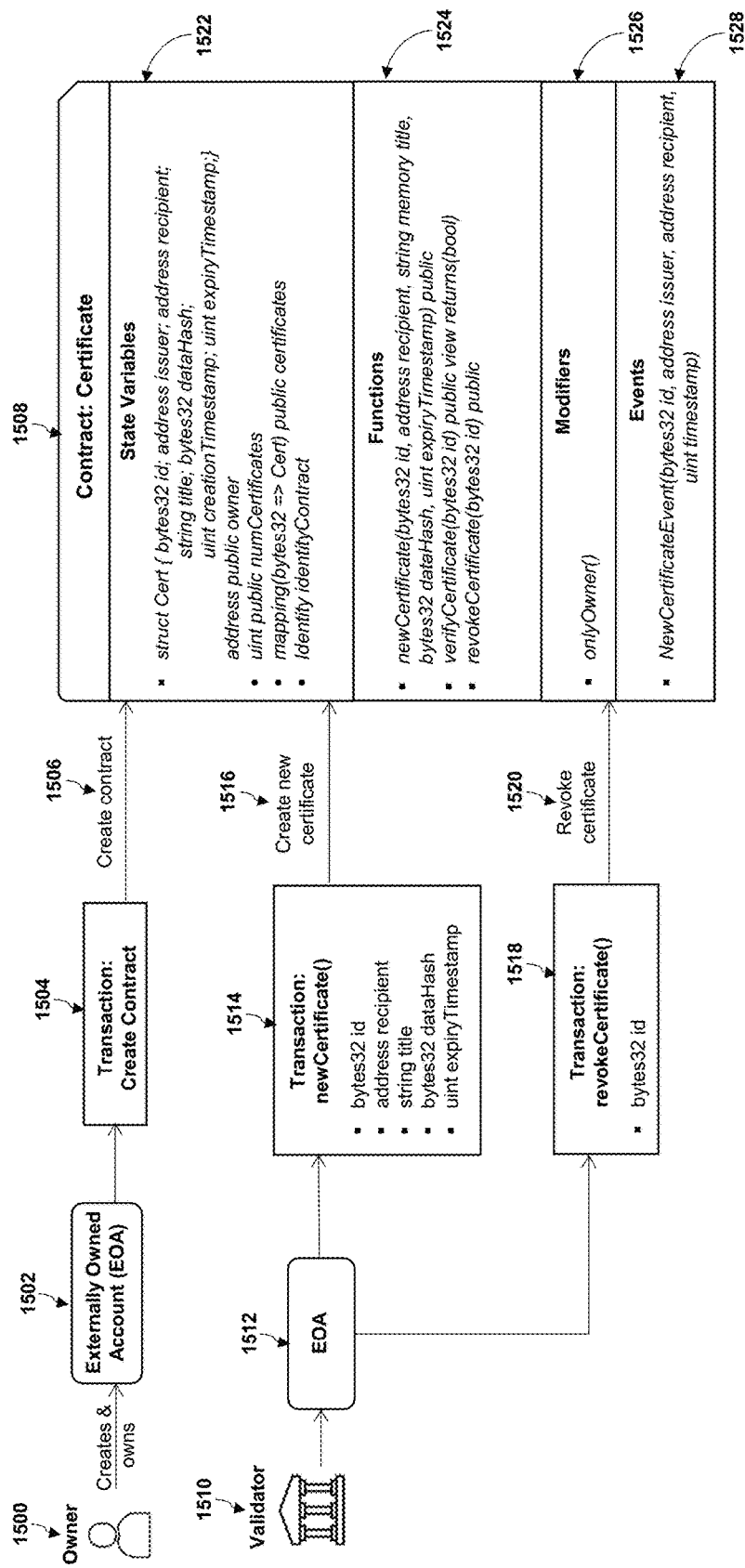
FIG. 22 is an illustration of an exemplary certificate smart contract according to an embodiment of the invention.

Referring to FIG. 22, an illustration of an exemplary certificate smart contract, according to an embodiment of the present invention is now described in detail. The Certificate smart contract 1508 contains state variables 1522, functions 1524, modifiers 1526 and events 1528. The Owner 1500 of the Certificate smart contract 1508 deploys the contract to a blockchain network by sending 1506 a contract creation transaction 1504 from an Externally Owned Account (EOA) 1502 linked to the Owner 1500. A validator 1510 creates a new certificate by sending 1516 a transaction 1514 to the newCertificate( ) function of the Certificate smart contract 1508 from an EOA 1512 associated with the validator 1510. The validator 1510 can revoke a certificate by sending 1520 a transaction 1518 to the newCertificate( ) function of the Certificate smart contract 1508 from its EOA 1512.

Figure 23:
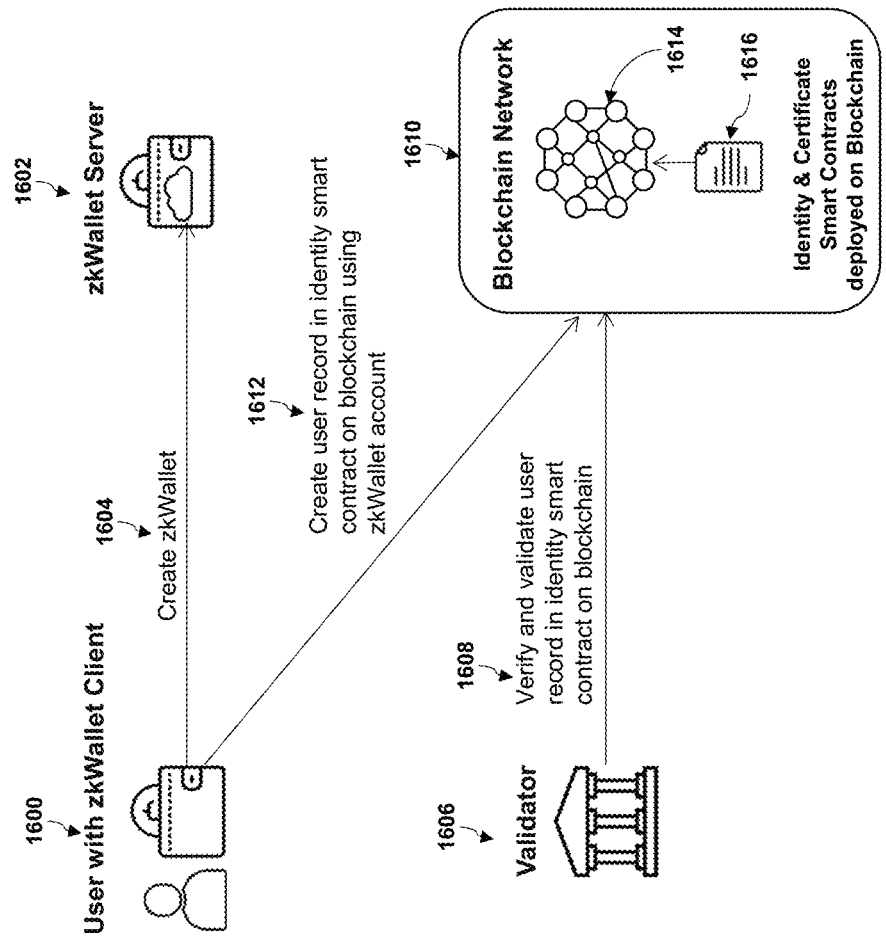
FIG. 23 is an illustration of a method of linking zkWallet with identity smart contracts according to an embodiment of the invention.

Referring to FIG. 23, an illustration of the process of linking zkWallet with identity smart contracts according to an embodiment of the invention is now described in detail. A User with zkWallet client application 1600 sets up a zkWallet account following the wallet setup 1604 and key generation process described in FIG. 15. The zkWallet Server 1602 stores the encrypted private key with user credentials. The User with zkWallet client application 1600 creates a user record in the identity smart contract deployed 1616 on the blockchain network 1614, by sending a transaction to the step 1612. The validator 1606 verifies and validates the user record in identity smart contract on the blockchain network 1614 at step 1608.

Figure 24:
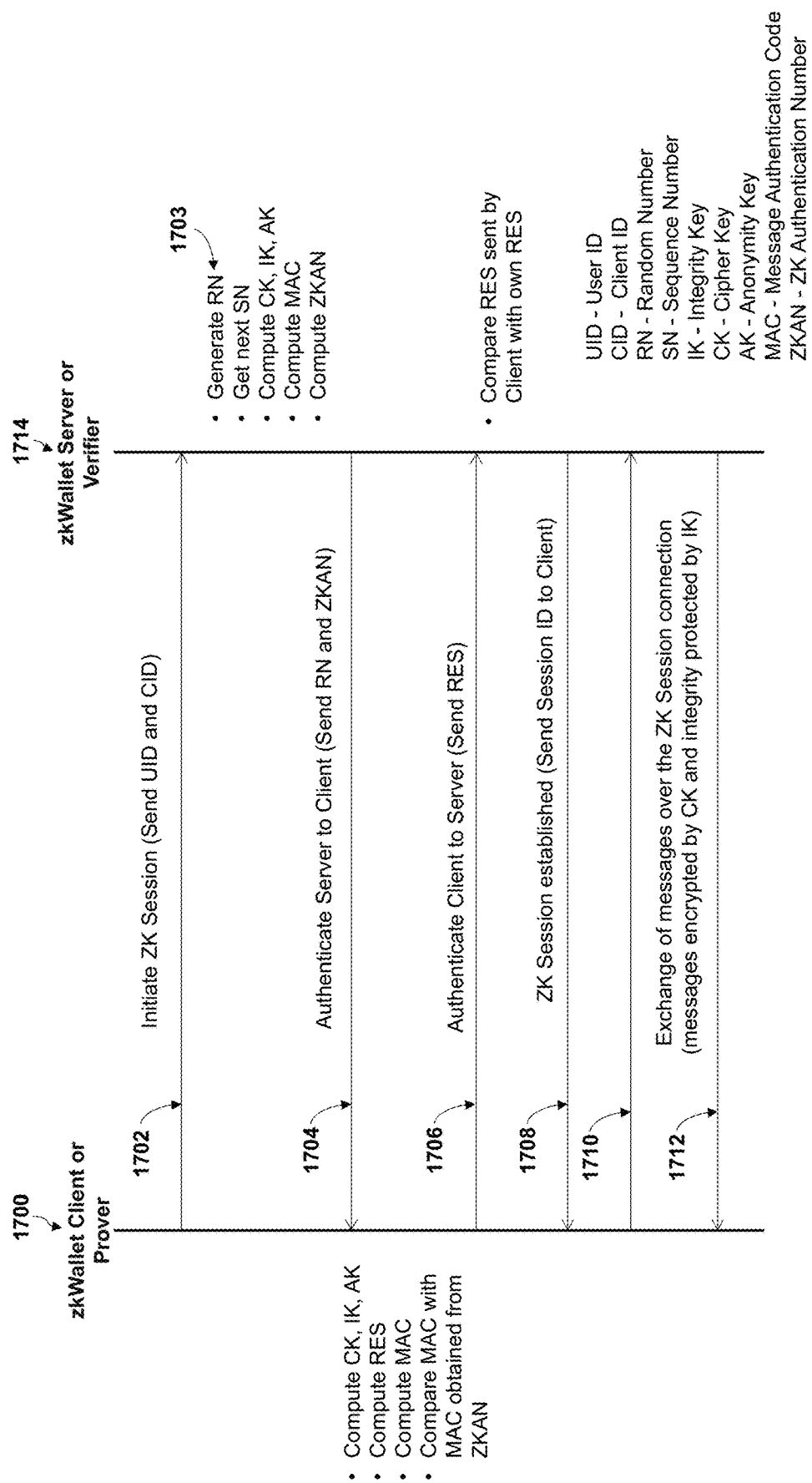
FIG. 24 is a process flow illustrating an exemplary method for bidirectional authentication between a client and server according to an embodiment of the invention.

Referring now to FIG. 24, a method of the present invention for bidirectional authentication to secure a connection between a client (such as zkWallet client or prover) and server (such as zkWallet server or verifier) is described in more detail. To prevent spoofing of connections and prevent man-in-the-middle attacks, bidirectional authentication may be used where the client 1700 and server 1714 authenticate each other. For example, and without limitation, a bidirectional authentication mechanism may involve the following data items:
  User ID (UID);
  Client ID (CID);
  Cipher Key (CK) may be used to encrypt the messages shared between the client and server;
  Integrity Key (IK) may be used for integrity protection of the messages shared between the client and server;
  Anonymity Key (AK) may be used in computing the ZK Authentication Number (ZKAN);
  Sequence Number (SN)—A new SN may be generated on each connection setup;
  Random Number (RN) may be generated using a random number generator;
  Message Authentication Code (MAC); and
  Zero Knowledge Authentication Number (ZKAN).

At step 1702, the client 1700 may initiate a session by sending a request to the server 1714 along with the User ID (UID) and Client ID (CID). At step 1703, the server 1714 may generate a random number (RN) and retrieves the next sequence number (SN).

Figure 25:
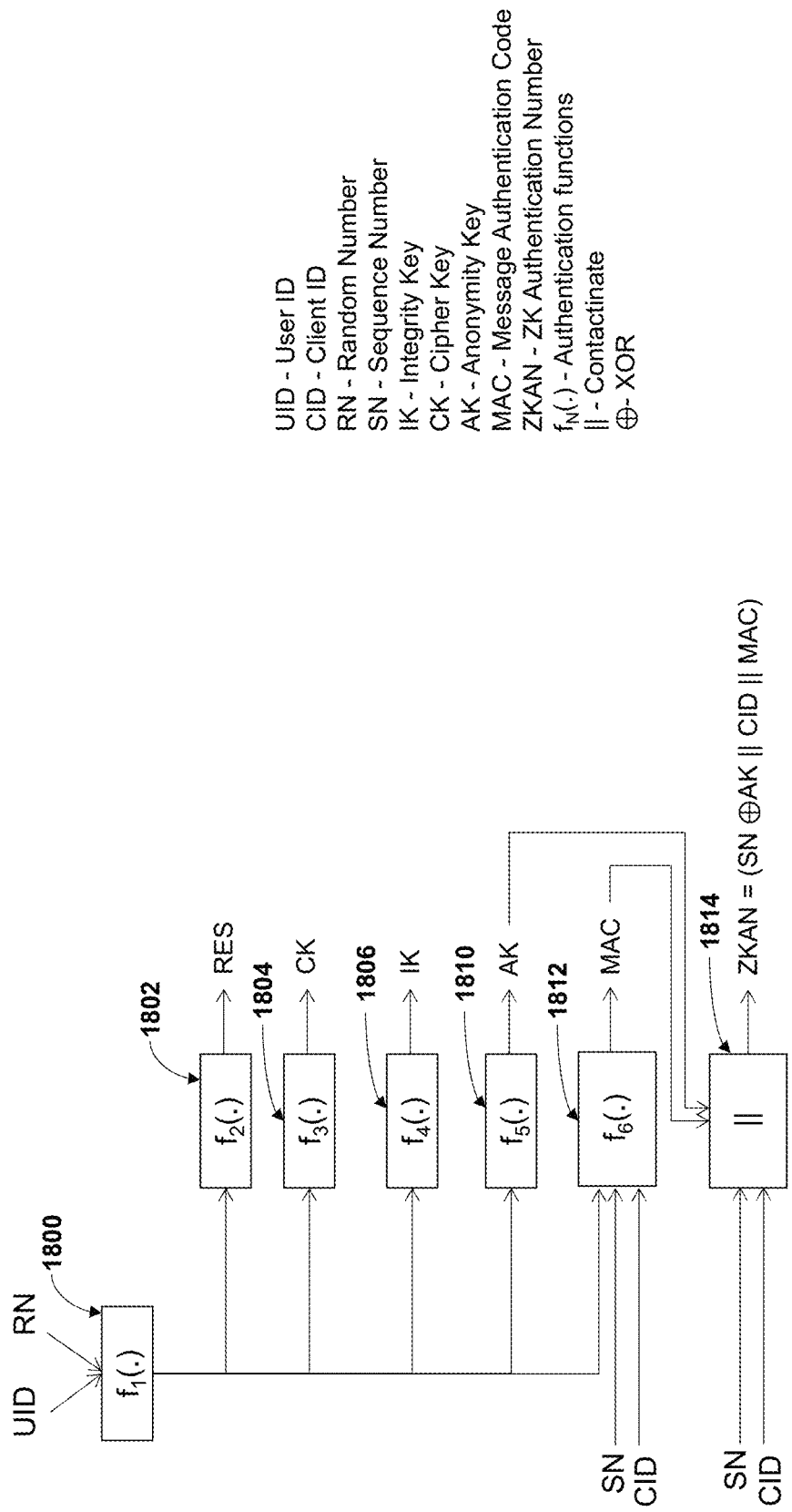
FIG. 25 is a process flow illustrating an exemplary method for authentication vector derivation at a server according to an embodiment of the invention.

Referring now additionally to FIG. 25 and continuing to refer to FIG. 24, a method aspect of the present invention for deriving authentication vectors at server is described in more detail. The server 1714 may input the UID and RN to the authentication function f1 (1800) and may feed the function f1 output to the authentication function f2 (1802) to compute the RES field which may be used in a later process step. Similarly, the output of the authentication function f1 (1800) may be given as input to authentication function f3 (1804), f4 (1806) and f5 (1810) respectively to compute the Cipher Key (CK), Integrity Key (IK) and Anonymity Key (AK). Next the output of the authentication function f1 (1800), Sequence Number (SN) and Client ID (CID) may be given as input to the authentication function f6 (1812) to compute the Message Authentication Code (MAC). The SN is then XORed with AK and concatenated to CID and MAC to compute the Zero Knowledge Authentication Number (ZKAN). At step 1704, the server 1714 may authenticate to the client 1700 by sending the RN and ZKAN.

Figure 26:
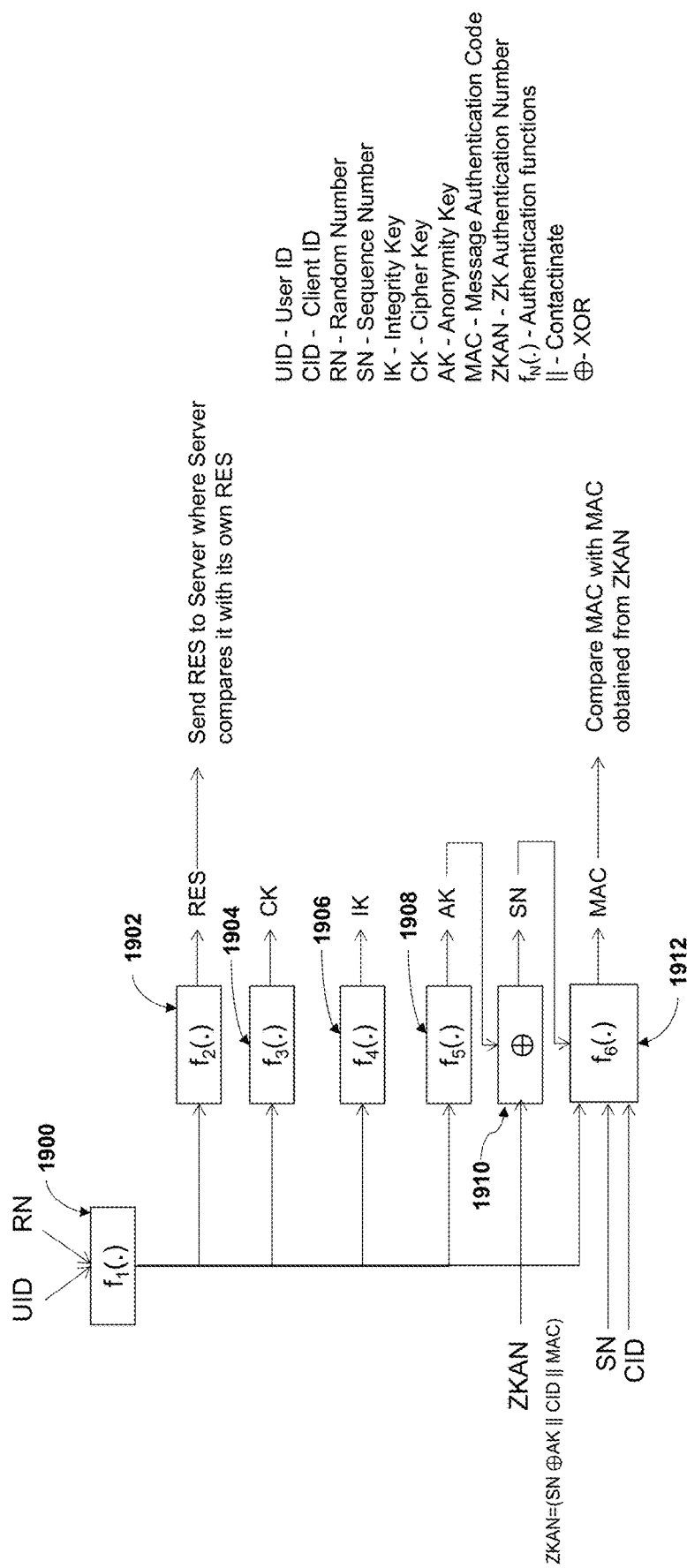
FIG. 26 is a process flow illustrating an exemplary method for authentication vector derivation at a client according to an embodiment of the invention.

Referring now additionally to FIG. 26 and continuing to refer to FIG. 24, a method aspect of the present invention for deriving authentication vectors at the client is described in more detail. At the client, the UID and RN as given as input to the authentication function f1 (1900) and its output may then be fed to authentication function f2 (1902) to compute the RES field. Similarly, the output of the authentication function f1 (1900) may be given as input to authentication function f3 (1904), f4 (1906) and f5 (1908) respectively to compute the Cipher Key (CK), Integrity Key (IK) and Anonymity Key (AK). Next, the ZKAN and AK are XORed to get the SN. Next the output of the authentication function f1 (1900), Sequence Number (SN) and Client ID (CID) may be given as input to the authentication function f6 (1912) to compute the Message Authentication Code (MAC). This MAC value may be compared with the MAC value obtained from the ZKAN field. If the MAC values match, the server 1714 is successfully authenticated with the client 1700. At step 1706, the client may send the RES field that it computed to the server 1714. The server 1714 may compare the RES sent by client 1700 with its own RES. If the RES values match, the client 1700 is successfully authenticated with the server 1714. At step 1708, a secure connection may be established and the server 1714 may send the ZK session ID to the client 1700. The client and server may then exchange messages 1710, 1712 securely over the secure connection. Each message 1710, 1712 may be encrypted by the Cipher Key (CK) and integrity protected by the Integrity Key (IK).

Figure 27:
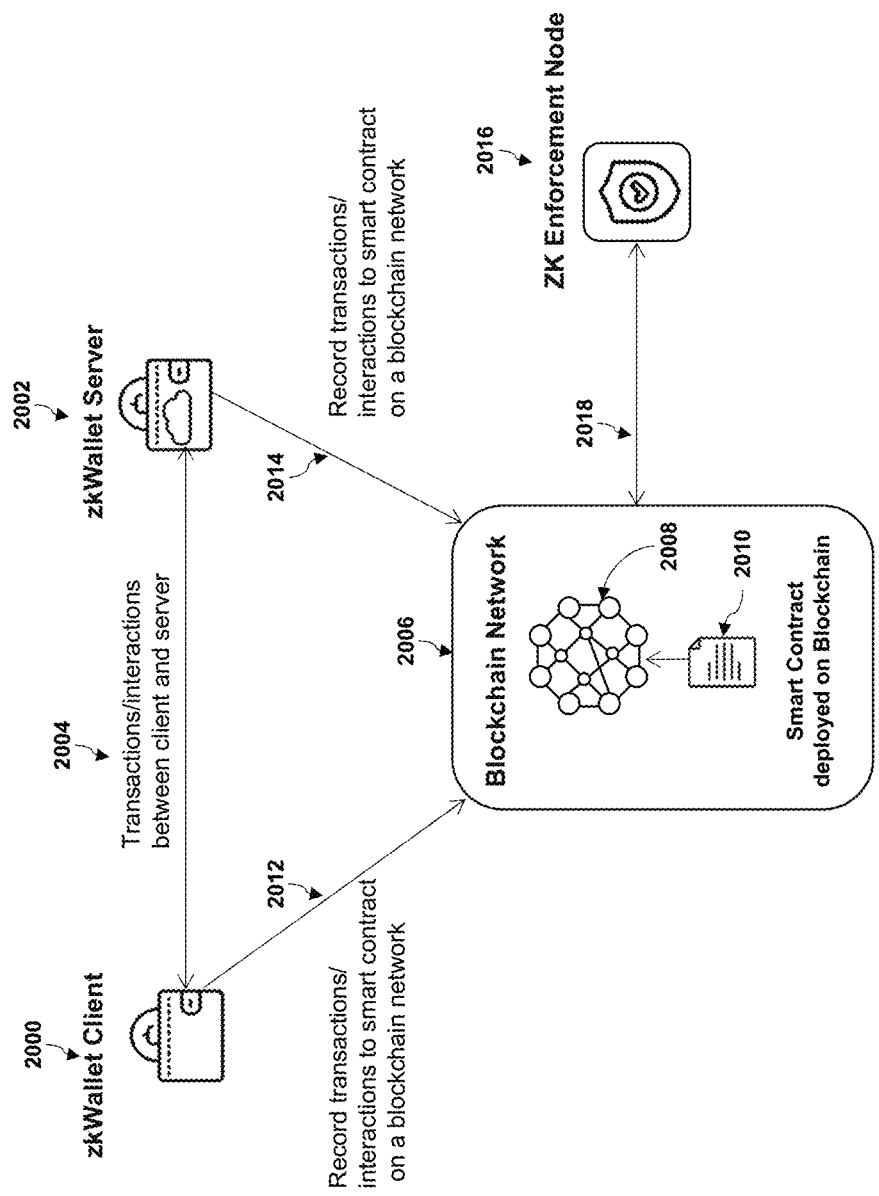
FIG. 27 is an illustration of a method for recording the transactions/interactions between a prover/client and verifier/server to a smart contract on a blockchain network according to an embodiment of the invention.

Referring now to FIG. 27, a method aspect of the present invention for recording the transactions/interactions between a prover/client and verifier/server to a smart contract on a blockchain network is described in more detail. A Zero Knowledge environment requires a Prover and a Verifier and they interact to prove an assertion is true. The verifier does not have knowledge of the assertion itself. Many verifiers can be malicious or dishonest and may seek to store and use the results of the interaction between the prover and the verifier to extract knowledge about the secret possessed by the Prover. The transactions/interactions 2004 between a prover/client 2000 (such as zkWallet client) and verifier/server 2002 (such as zkWallet server) are hashed along with the record of the transactions which are also hashed. Both these hashes are transmitted 2012, 2014 to and stored in a smart contract 2010 on a blockchain network 2008. ZK enforcement nodes 2016 "qualify" or "disqualify" 2018 a prover based on mismatches discovered through analysis of the interaction state logs, or if the verifier is seen to carryout additional transactions that are not part of the prover/verifier interaction.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method for implementing zero-knowledge private key management for decentralized applications on a computer device operating as a node on a blockchain network, the method comprising:
   receiving an identity smart contract creation transaction to create an identity smart contract from a zero-knowledge wallet account owned by an owner;
   generating an identity smart contract on an identity blockchain responsive to the identity smart contract creation transaction at an identity smart contract address on the blockchain network;
   receiving a new validator transaction to add a validator to the identity smart contract from the owner, the new validator transaction comprising a validator address of an account, wherein the account is owned by or associated with the validator;
   saving the validator address as an active validator to the identity smart contract responsive to the new validator transaction;
   receiving a new user transaction to register a user with the identity smart contract from the user;
   receiving a validate user transaction to validate the user from the validator;
   comparing the address from which the validate user transaction was received with the validator address;
   based on the comparison, determining the address from which the validate user transaction was received is identical to the validator address; and
   saving the user as a user to the identity smart contract.

2. The method of claim 1 wherein the validate user transaction comprises an address for an externally owned account owned by the user, defining a received user EOA address, the method further comprising:
   comparing the address from which the new user transaction was received with the received user EOA address; and
   based on the comparison, determining the address from which the new user transaction was received is identical to the received user EOA address; and
   saving the received user EOA address as a validated user address on the identity smart contract.

3. The method of claim 2 further comprising:
   receiving a revoke user validation transaction to revoke a user validation from the validator, the revoke user validation transaction comprising a revoke user address;
   comparing the revoke user address to each validated user address comprised by the identity smart contract;
   based on the comparison, identifying an identified user address that is identical to the revoke user address; and
   removing the identified user address as a validated user address from the identity smart contract.

4. The method of claim 1 wherein the new validator transaction further comprises an identifier associated with the validator.

5. The method of claim 1 wherein the new user transaction comprises an identifier associated with the new user and a first hashed data value associated with the user.

6. The method of claim 5 wherein the first hashed data value is hashed user data.

7. The method of claim 1 further comprising:
   receiving an inactivate validator transaction to inactivate a validator from the owner, the inactivate validator transaction comprising an inactivate validator address of the validator to inactivate;
   comparing the inactivate validator address with the validator address for each active validator;
   based on the comparison, identifying an identified validator having an active validator having a validator address that is identical to the inactivate validator address; and
   redefining the active validator as an inactive validator comprised by the identity smart contract.

8. The method of claim 1 further comprising:
   receiving a certificate smart contract transaction to create a certificate smart contract from the zero-knowledge wallet account owner by the owner;
   generating a certificate smart contract responsive to the certificate smart contract transaction at a certificate smart contract address on the blockchain network;
   receiving a new certificate transaction to create a new certificate to be comprised by the certificate smart contract from the validator; and saving a certificate to the certificate smart contract responsive to the new certificate transaction;
wherein the certificate smart contract comprises the identity smart contract.

9. The method of claim 8 wherein:
the certificate smart contract transaction comprises the identity smart contract address; and
the certificate smart contract is generated to comprise the identity smart contract address.

10. The method of claim 8 wherein:
the new certificate transaction comprises an identifier, a recipient address, and a second hashed data value; and
the certificate saved to the certificate smart contract comprises the identifier, the recipient address, and the second hashed data value.

11. The method of claim 10 wherein the second hashed data value is the hashed combination of the identity smart contract address and a token.

12. The method of claim 10 further comprising:
receiving a revoke certificate transaction to revoke a certificate from the validator, the revoke certificate transaction comprising a revoke certificate identifier;
comparing the revoke certificate identifier to the identifier for each certificate saved to the certificate smart contract;
based on the comparison, identifying an identified certificate comprising an identifier that is identical to the revoke certificate identifier; and
deleting the identified certificate from the certificate smart contract.

13. A method for implementing zero-knowledge private key management for decentralized applications on a computer device operating as a node on a blockchain network, the method comprising:
receiving an identity smart contract creation transaction to create an identity smart contract from a zero-knowledge wallet account owned by an owner;
generating an identity smart contract on an identity blockchain responsive to the identity smart contract creation transaction at an identity smart contract address on the blockchain network;
receiving a new validator transaction to add a validator to the identity smart contract from the owner, the new validator transaction comprising a validator address, wherein the account is owned by or associated with the validator;
saving the validator address as an active validator to the identity smart contract responsive to the new validator transaction;
receiving a new user transaction to register a user with the identity smart contract from the user;
receiving a validate user transaction to validate the user from the validator, the validate user transaction comprising a received user EOA address for an externally owned account owned by the user, defining a received user EOA address;
comparing the address from which the validate user transaction was received with the validator address;
based on the comparison, determining the address from which the validate user transaction was received is identical to the validator address;
comparing the address from which the new user transaction was received with the received user EOA address;
based on the comparison, determining the address from which the new user transaction was received is identical to the received user EOA address;
saving the user as a user on the identity smart contract;
saving the received user EOA address as a validated user address on the identity smart contract;
receiving a certificate smart contract transaction to create a certificate smart contract from the zero-knowledge wallet account owner by the owner;
generating a certificate smart contract responsive to the certificate smart contract transaction at a certificate smart contract address on the blockchain network;
receiving a new certificate transaction to create a new certificate to be comprised by the certificate smart contract from the validator; and
saving a certificate to the certificate smart contract responsive to the new certificate transaction;
wherein the certificate smart contract comprises the identity smart contract.

14. The method of claim 13 further comprising:
receiving a revoked user validation transaction to revoke a user validation, from the validator, the revoke user validation transaction comprising a revoke user address;
comparing the revoke user address to each validated user address comprised by the identity smart contract; and
based on the comparison, identifying an identified user address that is identical to the revoke user address; and
removing the identified user address as a validated user address from the identity smart contract.

15. The method of claim 13 wherein the new validator transaction further comprises an identifier associated with the validator.

16. The method of claim 13 wherein the new user transaction comprises an identifier associated with the new user and a first hashed data value associated with the user.

17. The method of claim 13 further comprising:
receiving an inactivate validator transaction to inactivate a validator from the owner, the inactivate validator transaction comprising an inactivate validator address of the validator to inactivate;
comparing the inactivate validator address with the validator address for each active validator; and
based on the comparison, identifying an identified validator having a validator address that is identical to the inactivate validator address; and
redefining the active validator as an inactive validator comprised by the identity smart contract.

18. The method of claim 17 wherein:
the certificate smart contract transaction comprises the identity smart contract address; and
the certificate smart contract is generated to comprise the identity smart contract address.

19. The method of claim 17 wherein:
the new certificate transaction comprises an identifier, a recipient address, and a second hashed data value; and
the certificate saved to the certificate smart contract comprises the identifier, the recipient address, and the second hashed data value.

20. A method for implementing zero-knowledge private key management for decentralized applications on a computer device operating as a node on a blockchain network, the method comprising:
receiving an identity smart contract creation transaction to create an identity smart contract from a zero-knowledge wallet account owned by an owner;
generating an identity smart contract on an identity blockchain responsive to the identity smart contract creation transaction at an identity smart contract address on the blockchain network;

receiving a new validator transaction to add a validator to the identity smart contract from the owner, the new validator transaction comprising a validator address of an account, wherein the account is owned by or associated with the validator, and an identifier associated with the validator;

saving the validator address as an active validator to the identity smart contract responsive to the new validator transaction;

receiving a new user transaction to register a user with the identity smart contract from the user, the new user transaction comprising an identifier associated with the new user and a first hashed data value associated with the user;

receiving a validate user transaction to validate the user from the validator, the validate user transaction comprising a received user EOA address for an externally owned account owned by the user;

comparing the address from which the validate user transaction was received with the validator address;

based on the comparison, determining the address from which the validate user transaction was received is identical to the validator address;

comparing the address from which the new user transaction was received with the received user EOA address;

based on the comparison, determining the address from which the new user transaction was received is identical to the received user EOA address;

saving the user as a user on the identity smart contract;

saving the received user EOA address as a validated user address on the identity smart contract;

receiving a certificate smart contract transaction to create a certificate smart contract from the zero-knowledge wallet account owner by the owner, the certificate smart contract transaction comprising the identity smart contract address;

generating a certificate smart contract responsive to the certificate smart contract transaction at a certificate smart contract address on the blockchain network, the certificate smart contract comprising the identity smart contract address;

receiving a new certificate transaction to create a new certificate to be comprised by the certificate smart contract from the validator; and saving a certificate to the certificate smart contract responsive to the new certificate transaction;

wherein the certificate smart contract comprises the identity smart contract.

\* \* \* \* \*